US007673664B2

(12) United States Patent
Kato et al.

(10) Patent No.: US 7,673,664 B2
(45) Date of Patent: Mar. 9, 2010

(54) STICKING TOOL

(75) Inventors: Kousuke Kato, Osaka (JP); Kuniyuki Yonekura, Osaka (JP); Tatsuya Kato, Nagoya (JP)

(73) Assignee: Kokuyo S&T Co., Ltd., Osaka-shi (JP)

( * ) Notice: Subject to any disclaimer, the term of this patent is extended or adjusted under 35 U.S.C. 154(b) by 875 days.

(21) Appl. No.: 11/488,790

(22) Filed: Jul. 19, 2006

(65) Prior Publication Data

US 2007/0031073 A1 Feb. 8, 2007

(30) Foreign Application Priority Data

Jul. 25, 2005 (JP) ............................ 2005-214026

(51) Int. Cl.

| | |
|---|---|
| ***B29C 65/48*** | (2006.01) |
| ***B29C 65/50*** | (2006.01) |
| ***B29C 65/56*** | (2006.01) |
| ***B32B 37/12*** | (2006.01) |
| ***B65C 9/08*** | (2006.01) |
| ***B65C 9/10*** | (2006.01) |
| ***B65C 9/12*** | (2006.01) |
| ***B65C 9/26*** | (2006.01) |
| *B29C 65/52* | (2006.01) |
| *B32B 37/14* | (2006.01) |
| *B32B 38/04* | (2006.01) |
| *B65C 9/36* | (2006.01) |

(52) U.S. Cl. ....................... 156/579; 156/564; 156/573

(58) Field of Classification Search ................ 156/579; 384/91, 129, 130, 192, 193, 202

See application file for complete search history.

(56) References Cited

U.S. PATENT DOCUMENTS

| | | | | |
|---|---|---|---|---|
| 4,072,554 | A * | 2/1978 | McKibben | 156/514 |
| 5,595,626 | A * | 1/1997 | Yokouchi et al. | 156/577 |
| 6,397,652 | B1 * | 6/2002 | Sollami | 72/360 |
| 7,172,007 | B1 * | 2/2007 | Hui | 156/540 |
| 7,318,465 | B1 * | 1/2008 | Hui | 156/540 |

FOREIGN PATENT DOCUMENTS

| | | |
|---|---|---|
| JP | 11-11073 (A) | 1/1999 |
| JP | 11-198579 (A) | 7/1999 |

* cited by examiner

*Primary Examiner*—Philip C Tucker
*Assistant Examiner*—Sonya Mazumdar
(74) *Attorney, Agent, or Firm*—Westerman, Hattori, Daniels & Adrian, LLP

(57) ABSTRACT

This invention provides a sticking tool capable of sticking a sticking matter to a sticking target position easily and accurately and executing the sticking operation smoothly. This sticking tool includes a casing body 2, a sticking tool main body 3 which is moved in the direction of being projected from and submerged into the casing body 2 by a pressing force F1 applied at the time of sticking operation so as to stick a patch P to the peripheral portion Xb of a punch hole Xa and an alignment portion 7 for determining a relative position of the sticking tool main body 3 to the punch hole Xa and the alignment portion 7 is so constructed to be capable of moving between an overlapping position (Q) which substantially overlaps the peripheral portion Xb of the punch hole Xa and a retraction position (R) not interfering with the sticking tool main body 3 and paper X.

14 Claims, 13 Drawing Sheets

(a)

(b)

(a)

(b)

(c)

STICKING TOOL

BACKGROUND OF THE INVENTION

1. Field of the Invention

The present invention relates to a sticking tool for sticking a sticking matter such as patch or ink to a specified sticking target position on any sticking target material such as paper.

2. Description of the Related Art

Conventionally, a method for keeping a binding tool going through punch holes formed on an edge of paper has been adopted to bind a plurality of papers, and patches have been on the market which can be bonded so as to surround the punch hole as a reinforcement member to prevent those punch holes from being broken or as a repair member for a broken punch hole.

To enable sticking of the patches effectively without weakening its bonding force, there has been known a stapler type patch sticking tool (Japanese Patent Application Laid-Open No. H11-11073 (see such as FIGS. 1 and 7)) so constructed that an upper handle including a shaft portion for holding stacked patches and a lower handle including a separation table for automatically separating the stacked patches from a paper or the like after the patch is stuck to the paper by sandwiching the paper or the like. Additionally, there has been also known a patch sticking tool formed in a compact manner as disclosed in Japanese Patent Application Laid-Open No. H11-198579 (see such as FIGS. 2 and 6), namely, a self-standing enabled type patch sticking tool which includes a shaft portion holding patches stacked a sticking tool main body having a pressing face for applying a pressing force to the patch along its shaft portion and a cap acting as the separation table for automatically separating the stacked patches from a paper or the like after the patch is stuck to the paper or the like by sandwiching the paper. The separation table of each of these patch sticking tools is provided with a recessed portion (circular hole or circular groove) which is capable of receiving the distal end of a shaft portion, so that the patch can be stuck to the peripheral portion of the punch hole by applying a specified operation force after a paper or the like is inserted such that it is sandwiched by the separation table aligning this recessed portion with the punch hole. That is, the separation table having the recessed portion functions as an alignment portion which gives an alignment position to stick the patch to the peripheral portion of the punch hole.

However, because the mutual positional relation between the separation table functioning as an alignment portion and a paper in any of the above-described patch sticking tools does not change until the paper is pulled out from the separation table (that is, to separate the paper and the separation table from each other) after paper is inserted into the separation table and the patch is stuck to the peripheral portion of the punch hole, a work of separating the paper form the separation table is required as well as a work of applying an operation force (pressing force) for sticking the patch, thereby making the entire patch sticking operation troublesome. Particularly, when each patch is stuck to the peripheral portion of a punch hole in a plurality of papers sequentially, the inconvenience in operation becomes conceivable so that its practicality is very low. Further, because this patch sticking tool requires a person to apply the pressing force with one hand while gripping a paper with another hand, its operability is low from this viewpoint.

Further, there have been developed a variety of stamps which incorporate a stamp main body and an ink storage portion (member soaked with ink or vermilion) in its casing and are so constructed that the ink storage portion can move between a position which makes contact with a stamping portion provided at the front end of the stamp main body and a position which is incapable of making contact with the stamping portion when an operation force (pressing force) for stamping is applied. However, no conventional stamps have an alignment portion for giving an alignment position for sticking ink or vermilion to a stamping target position and further, because upon actual use, ink or vermilion applied on the stamping portion of the stamp main body is stuck to a specified position within an outer diameter of a casing when the operation force is applied, with the distal end portion of the casing kept in contact with the vicinity of the specified stamping target position on a paper or the like, the position to which the ink or vermilion is to be stuck cannot be grasped accurately before it is stuck actually, which is an inconvenience demanded to be solved. The degree of this inconvenience is more apparent as the ratio of a stamping area relative to the outer diameter of the casing decreases.

SUMMARY OF THE INVENTION

The present invention has been achieved paying attention to the above-described problems and an object of the invention is to provide a sticking tool capable of sticking a sticking matter such as patch and ink to a sticking target position easily and accurately and executing the sticking work smoothly.

To achieve the above-described object, according to the present invention, there is provided a sticking tool for sticking a sticking matter such as patch or ink to a predetermined sticking target position on a sticking target material such as paper, including: a casing body whose distal end portion makes contact with the sticking target material at the time of sticking operation; a sticking tool main body which is moved in the direction of being projected from and submerged into the casing body by a pressing force applied at the time of the sticking operation so as to stick the sticking matter to the sticking target position; an alignment portion which gives an alignment position for sticking the sticking matter to the sticking target position; and an actuating mechanism which movably actuates the alignment portion between an overlapping position which substantially overlaps the sticking target position, positioning between the distal end portion of the sticking tool main body and the sticking target material, and a retraction position not interfering with the sticking tool main body and the sticking target material, wherein, when the pressing force is applied, the actuating mechanism actuates the alignment portion to move from the overlapping position to the retraction position.

The "sticking matter" mentioned here is a concept including all matters having a property which enables them to be stuck to a target object, such as patch, ink, vermilion, seal, tape adhesive and paper. Further motions of the alignment portion between the overlapping position and the retraction position include a rotary motion and horizontal motion and the like.

Consequently, a position to which a sticking matter is to be stuck can be grasped easily and accurately using this alignment portion because an alignment position is given by the alignment portion and the sticking matter can be stuck to a sticking target position accurately. Further because the alignment portion is moved from the overlapping position to the retraction position when a pressing force is applied at the time of sticking operation, the work for moving the alignment portion in the direction of separating the alignment portion from the sticking target material independently of an operation for applying the pressing force becomes unnecessary as compared with a conventional patch sticking tool, thereby executing a series of the sticking operation smoothly. Further because the sticking matter can be stuck to the sticking target position with the alignment portion kept at the retraction position by applying the pressing force with the distal end portion of the casing body kept in contact with the sticking target material, the work for "sandwiching a paper or the like in part of the sticking tool" which is necessary upon sticking operation in the conventional patch sticking tool is unnecessary, so that the sticking operation can be carried out only with one hand which applies the pressing force with any sticking target material such as paper placed on a tabletop, whereby securing an excellent operability. Additionally, the alignment portion located at the overlapping position functions as a cap for preventing foreign matter from adhering to the sticking matter and the quantity of necessary components can be effectively reduced as compared with a type requiring a special cap.

Because the actuating mechanism includes a rotating portion for rotating the alignment portion with respect to the casing body between the overlapping position and the retraction position and a rotation shaft of the rotating portion is set at a position deviated to an opposite direction to the rotation direction from the overlapping position of the alignment portion to the retraction position with respect to an axis of the casing body, the alignment portion can be brought as close to the sticking target position as possible when it is located at the overlapping position thereby simplifying an alignment operation.

The rotating portion may be constituted by rotating shafts provided on the alignment portion and rotary shaft receiving portions provided on the casing body and for supporting the rotating shafts.

Because the actuating mechanism includes a guide portion for guiding a rotary motion of the alignment portion between the overlapping position and the retraction position, the rotation of the alignment portion can be carried out smoothly with this guide portions.

Because the guide portion includes: a guide shaft provided on the alignment portion; guide grooves provided on the sticking tool main body, and guiding the guide shafts along a predetermined trajectory so that the alignment portion takes the overlapping position or the retraction position accompanied by a relative motion of the sticking tool main body in the direction of being projected from and submerged into the casing body; and guide holes through the casing body, which allows the guide shafts to move relative to the guide grooves with the guide shafts inserted therethrough, the rotation of the alignment portion can be guided with the alignment portion, the sticking tool main body and the casing body related to each other closely.

Further because the casing body is formed of transparent material, the alignment portion includes an alignment portion main body having a target portion which communicates with or overlaps the sticking target position at the overlapping position, and the alignment portion main body is substantially in a thin plate shape, the target portion can be positioned by communication with or overlapping the sticking target position at the overlapping position using the transparent case even if the sticking tool main body is surrounded by the casing body. Further because the target portion is formed into a substantially thin plate like alignment portion main body, the operation accuracy for making the target portion communicate with or overlap the sticking target position can be improved effectively as compared with an embodiment in which this target portion is formed into a substantially thick plate-like alignment portion main body. In the meantime, the target portion may be of any type, for example, a type communicating with the sticking target position or a type overlapping the sticking target position and in the latter case, if other portion than the target portion of the alignment portion main body is constituted of transparent material, positioning between the target portion and the sticking target position can be carried out easily.

According to the present invention, the sticking target position is the peripheral portion of a punch hole formed in the sticking target material, the sticking tool further comprising: a shaft portion holding the stacked patches as a sticking matter in a condition in which the shaft is inserted into holes of the patches and is capable of moving in the direction of being projected from and submerged into the sticking tool main body; and a shaft holder which is provided in the sticking tool main body and capable of holding the shaft portion, and a holding portion is provided between the shaft portion and the shaft holder, thereby allowing the shaft portion to move only in the direction of being submerged into the sticking tool main body when a pressing force is applied at the time of the sticking operation and exerting a specific holding force. By moving the shaft portion in the direction of being submerged into the sticking tool main body with a decrease of the quantity of patches stacked around the shaft portion, the stacked patches can be sandwiched between the distal end portion of the sticking tool main body and the distal end portion of the shaft portion so as to make the shaft portion function as an adjuster mechanism. Further, because the shaft portion is blocked from moving in the direction in which it projects from the sticking tool main body, the shaft portion is prevented from loosing out of the sticking tool main body unexpectedly when a patch to be stuck to the peripheral portion of the patch hole is separated from other patch left on the shaft portion and the separation action between the one patch and the other patch can be carried out smoothly.

According to a preferred embodiment of the present invention, the holding portion includes: a saw-like first meshing portion provided on the shaft portion; and a saw-like second meshing portion provided on the shaft holder, and capable of engaging the first meshing portion, and the holding portion is configured to change the meshing position between the first meshing portion and the second meshing portion only in the direction in which the shaft portion is submerged into the sticking tool main body.

According to another preferred embodiment of the present invention, the shaft holder includes a holder shaft portion provided at the distal end portion and supported by the sticking tool main body; and a contact portion that is elastically deformable and provided at the proximal end portion, the contact portion making contact with either the sticking tool main body or a different member provided in the sticking tool main body when the shaft holder is mounted in the sticking tool main body, and the holding portion generates a spring action in an entire shaft holder by bringing the contact portion into a pressure contact with either the sticking tool main body or the different member provided in the sticking tool main body to elastically deform the contact portion, whereby the shaft holder being urged by this spring action in the direction in which the first meshing portion and the second meshing portion mesh each other. Consequently, the meshing condition between the first meshing portion and the second meshing portion can be improved and further because the shaft holder itself is made to function as an urging means, the quantity of necessary components can be reduced as compared with an embodiment in which any special urging means is provided.

It is preferable that the patches can be recharged when patches held on the shaft portion are consumed completely.

To achieve this, it is possible to provide a meshing condition releasing portion for releasing the meshing condition between the first meshing portion and the second meshing portion attained by the holding portion between the shaft portion and the shaft holder so that the shaft portion can be pulled out of the sticking tool main body.

According to still another preferred embodiment of the present invention, the shaft holder includes: a holder shaft portion provided at the distal end portion and supported by the sticking tool main body; a contact portion that is elastically deformable and provided at the proximal end portion, the contact portion making contact with either the sticking tool main body or the different member provided in the sticking tool main body when the shaft holder is mounted in the sticking tool main body; and a button portion capable of being exposed outside of the sticking tool main body when the shaft holder is mounted in the sticking tool main body, the holding portion generates a spring action in the entire shaft holder by bringing the contact portion into a pressure contact with either the sticking tool main body or the different member provided in the sticking tool main body so that the shaft holder is urged by the spring action in the direction in which the first meshing portion and the second meshing portion mesh each other, and the meshing condition releasing portion rotates the shaft holder with the holder shaft portion as a fulcrum point in the direction in which the second meshing portion departs from the first meshing portion by giving a predetermined operation force resisting the urging force by the spring action. Consequently, the shaft portion can be pulled out of the sticking tool main body by a simple operation of pressing the button portion thereby securing a high practicality.

Further, because the other member is a shaft receiving member which receives the shaft portion passing through the shaft holder and corrects the submersion direction of the shaft portion, the shaft portion can be moved in the direction of being submerged into the sticking tool main body smoothly and accurately.

According to the present invention, as described above, the position to which the sticking matter is to be stuck actually can be grasped easily and accurately using the alignment portion which gives an alignment position for sticking a sticking matter to a sticking target position and a relative position of the sticking tool to the sticking target position can be determined accurately. Further, because this alignment portion is moved from the overlapping position to the retraction position when the pressing force is applied at the time of the sticking operation, the work of moving the alignment portion and the sticking target material in the direction in which they depart from each other independently of an operation of giving the pressing force becomes unnecessary, thereby achieving a series of the sticking operations smoothly.

DESCRIPTION OF THE PREFERRED EMBODIMENTS

Hereinafter, the preferred embodiment of the present invention will be described with reference to the accompanying drawings.

Figure 1:
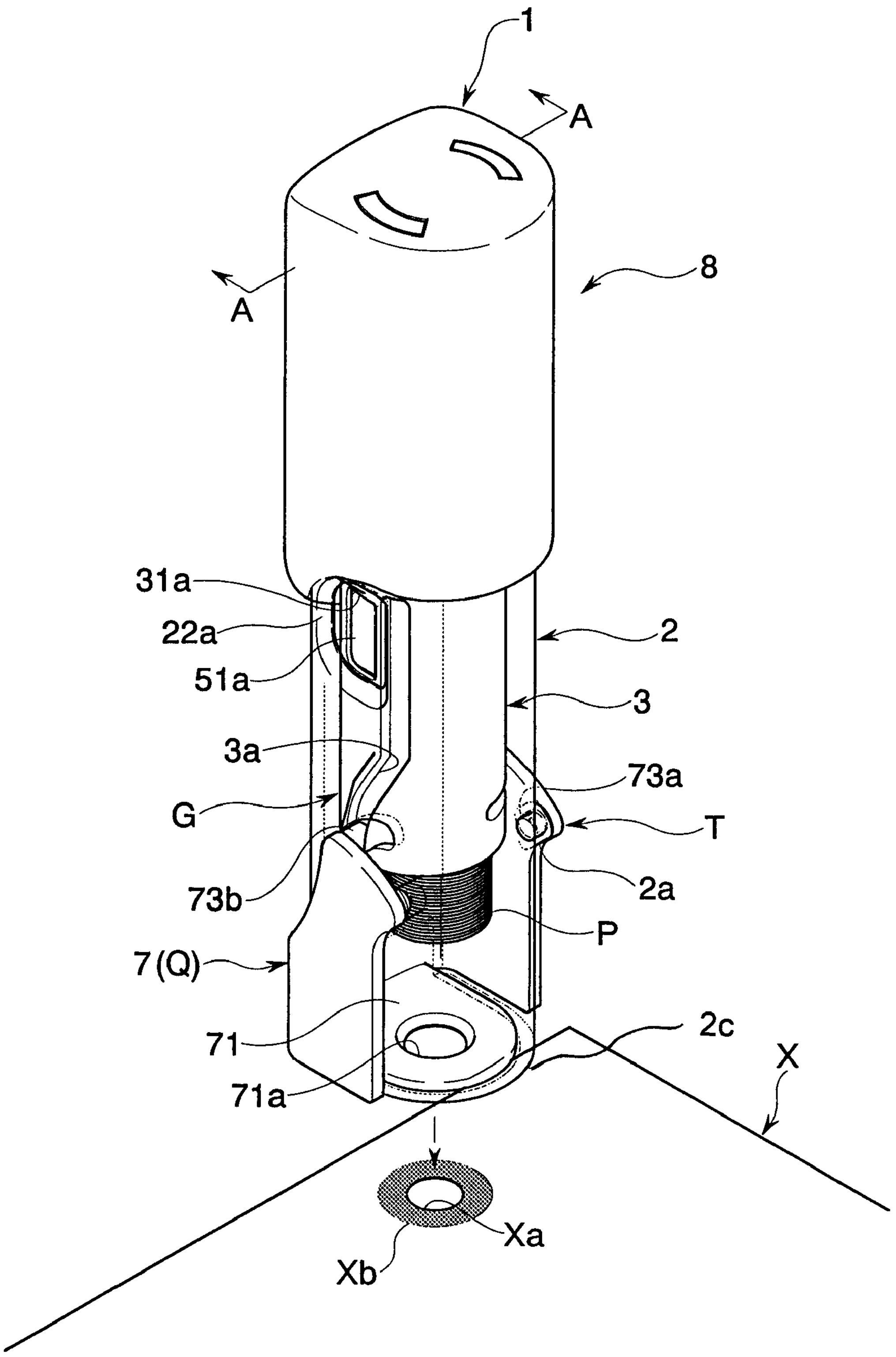
PRIOR ART Fig.1
FIG. 1 is an entire perspective view of a sticking tool according to an embodiment of the present invention.

As shown in FIG. 1, the sticking tool 1 of this embodiment is used to stick a patch P which is a sticking matter to the peripheral portion Xb of a punch hole Xa, which is a sticking target position, formed in a paper X as a sticking target material using a perforating means.

Figure 2:
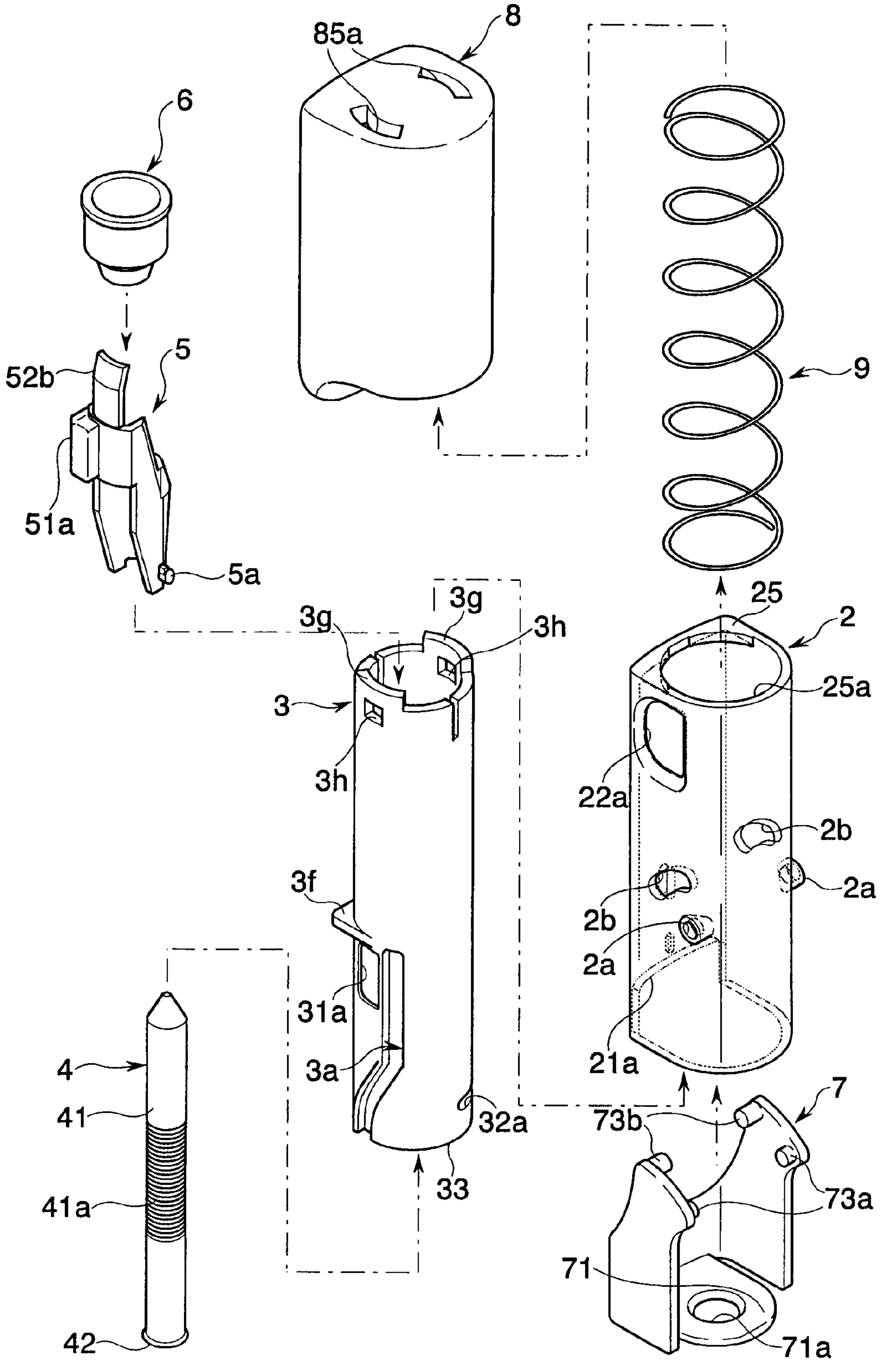
Fig.2 PRIOR ART
FIG. 2 is a disassembly perspective view of the sticking tool.

As shown in FIGS. 1, 2, this sticking tool 1 includes a casing body 2 whose distal end (bottom end portion 2*c*) makes contact with the vicinity of the peripheral portion Xb of the punch hole Xa, a sticking tool main body 3 having a bottom face portion 33, which is moved in the direction of projection from/submersion into the casing body 2 by a pressing force F1 applied at the time of sticking operation and applies the pressing force F1 to the patch P, a shaft portion 4 for holding patches P, each having a hole in which the shaft portion 4 is inserted, with those patches P loaded around the shaft portion 4 in a condition in which they are stacked and bonded with each other under a pressure and being able to be inserted into the sticking tool main body 3, a shaft holder 5 capable of holding the shaft portion 4 accommodated inside the sticking tool main body 3, a shaft portion receiving member 6 that receives the shaft portion 4 after passing through the shaft holder 5, an alignment portion 7 for giving an alignment position to stick the patch P to the peripheral portion Xb of the punch hole Xa and a handle 8 which is mounted on the proximal end portion (top end portion) side pf the sticking tool main body 3 and receives the pressing force F1 directly.

Figure 3:
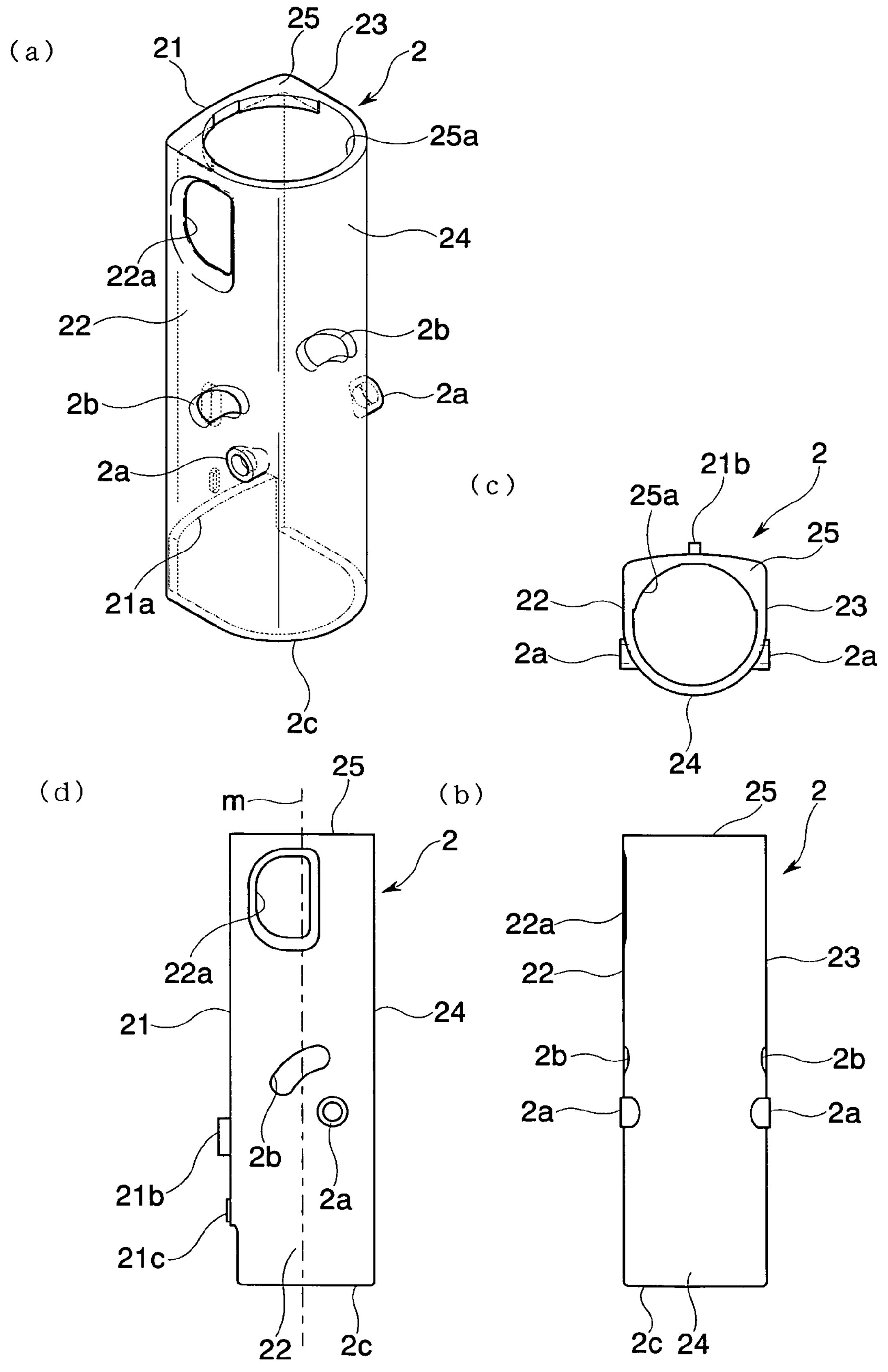
FIG. 3 illustrates a casing body of the embodiment.

As shown in FIG. 3 ((a) of FIG. 3 is a perspective view of the casing body 2, (b) of FIG. 3 is a front view thereof, (c) of FIG. 3 is a plan view thereof and (d) of FIG. 3 is a side view thereof), the casing body 2 is formed of transparent synthetic resin material into a cylindrical configuration having a substantially D-shaped section as seen in plan view with its rear face portion 21 and both side face portions 22, 23 formed in a substantially flat shape and its front face portion 24 formed with a roundness. This casing body 2 has a top face portion 25 having an insertion hole 25*a* which allows the upper half portion of the sticking tool main body 3 to go through and the stopper portion 3*f* of the sticking tool main body 3 described later comes into contact with this top face portion 25 from downward so that the sticking tool main body 3 inserted into the casing body 2 is prevented from loosing out upward of the casing body 2. Further, respective side face portions 22, 23 have a rotary shaft receiving portion 2*a* for supporting a rotary shaft 73*a* of the alignment portion 7 described later and a guide hole 2*b* which allows a rotation of a guide shaft 73*b* of the alignment portion 7 described later. The rotary shaft receiving portion 2*a* is provided at a position near the front face portion 24 with respect to an axis m (central axis) of the casing body 2 and more specifically, the rotary shaft receiving portions 2*a* are provided so as to project outward from a connection portion between the side face portion 22, 23 and the front face portion 24 in a substantially cylindrical form which the rotary shaft 73*a* can be fitted to. The guide holes 2*b* go through in the thickness direction of the respective side face portions 22, 23 and are formed in a substantially partial circular arc with respect to the rotary shaft 73*a*. On the other hand, the side face portion 22 has a window portion 22*a* which allows a button portion 51*a* of the shaft holder 5 to be exposed outside. Further, the rear face portion 21 has a U-shaped cutout portion 21*a* directed substantially downward so that the bottom end portion of the rear face portion 21 is located above the bottom end portion of the front face portion 24 and the both side face portions 22, 23. An alignment portion strike portion 21*b* which is projected rearward so that part of the alignment portion 7 can strike it is provided in the vicinity of the bottom end portion of this rear face portion 21 and a handle strike portion 21*c* is provided above the alignment portion strike portion 21*b* such that it is projected rearward so that the part of the handle 8 can strike. In a following description, "bottom end portion 2*c* of the casing body 2" means "bottom portions of the front face portion 24 and the both side face portions 22" unless otherwise specified. Further, because the casing body 2 is formed of transparent material, a portion overlapping the casing body 2 is expressed with a solid line in FIG. 1 and FIGS. 11-13 described later.

Figure 4:
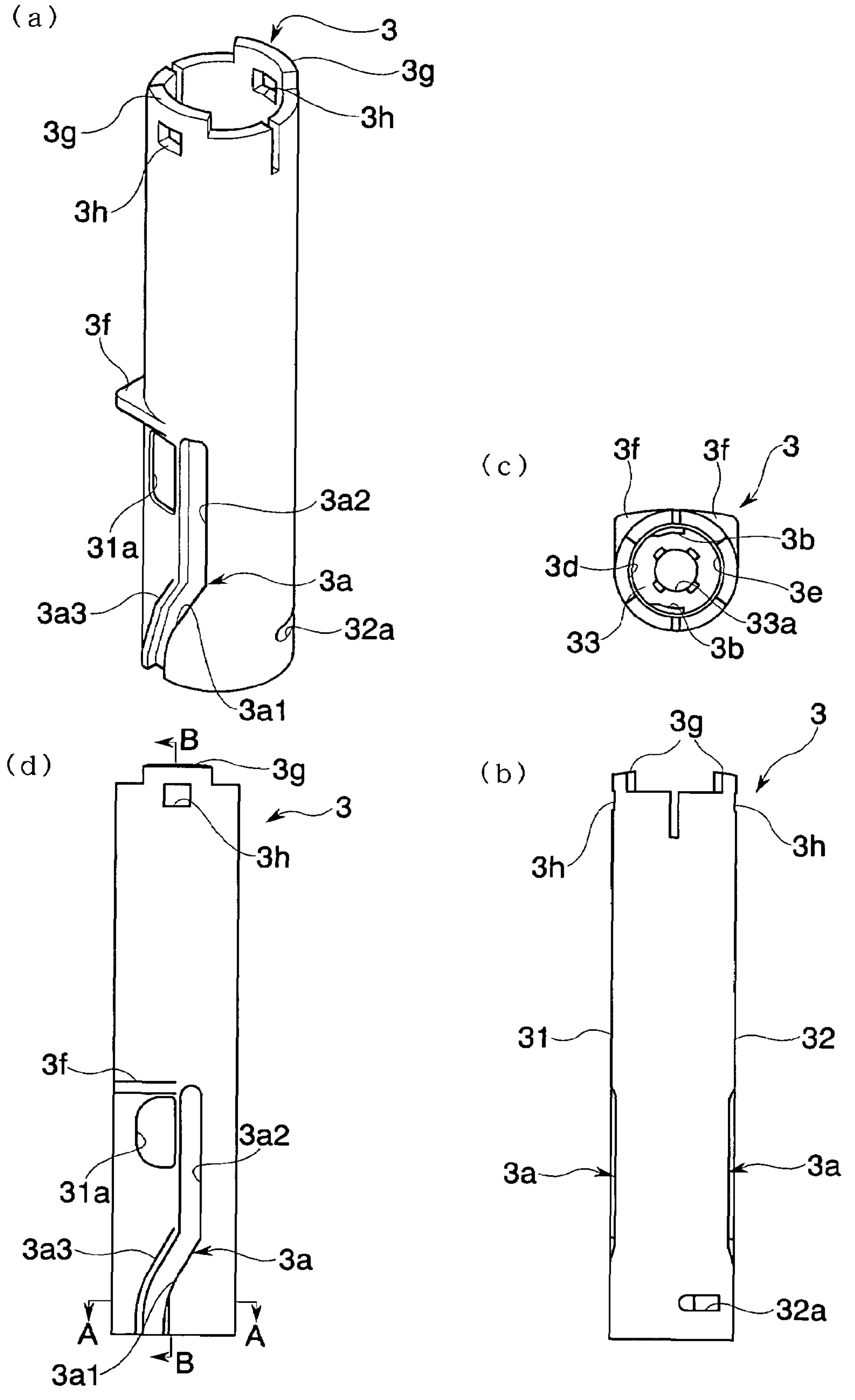
FIG. 4 illustrates a sticking tool main body of the embodiment.
Figure 5:
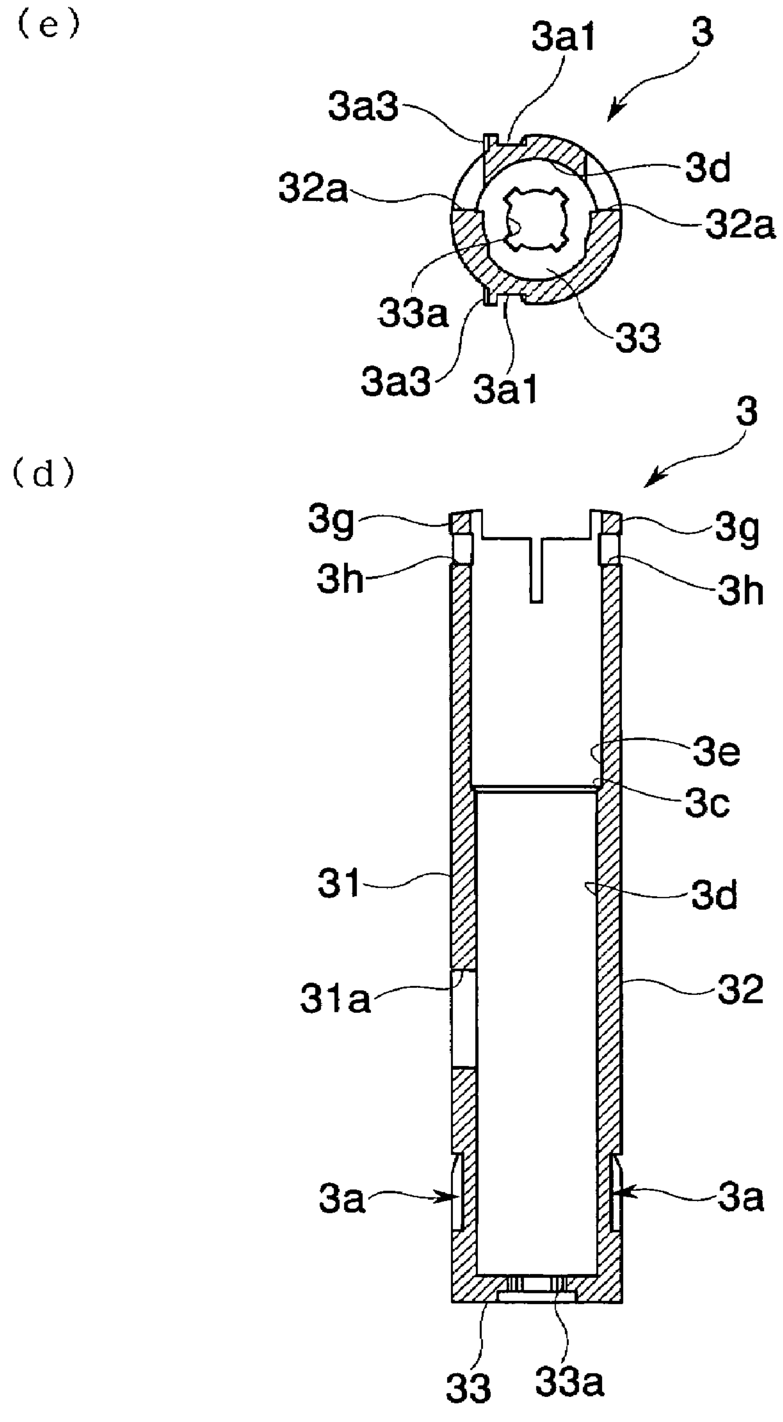
FIG. 5 illustrates the sticking tool main body of the embodiment.

As shown in FIGS. 4, 5 ((a) of FIG. 4 is a perspective view of the sticking tool main body 3, (b) of FIG. 4 is a front view thereof, (c) of FIG. 4 is a side view thereof as seen from the side portion 31, (d) of FIG. 4 is a plan view thereof, (e) of FIG. 5 is a sectional view taken along the line A-A in (c) of FIG. 4 and (f) of FIG. 4 is a sectional view taken along the line B-B in (c) of FIG. 4), the sticking tool main body 3 is formed of for example, synthetic resin material in a substantially cylindrical shape. Both the side portions 31, 32 of the sticking tool main body 3 have a guide groove 3*a* for guiding the guide shaft 73*b* of the alignment portion 7 described later along a predetermined trajectory. Each guide groove 3*a* is constituted by a circular portion 3*a*1 which is formed in a partial circular arc having an arc milder than the guide hole 2*b* starting from the bottom end of the sticking tool main body 3 and a linear portion 3*a*2 which extends linearly along the length direction of the sticking tool main body 3 from the top end of the circular portion 3*a*1. An elevated portion 3*a*3 which is elevated relative to other portions along the circular portion 3*a*1 is provided to block the guide shaft 73*b* moving along the circular portion 3*a*1 from riding over and loosing out of the circular portion 3*a*1 by this elevated portion 3*a*3. A button fitting portion 31*a* which the button portion 51*a* of a shaft holder 5 described later can be fitted to is formed in one side portion 31 and a pair of holder shaft receiving holes 32*a* which support the holder shaft portions 5*a* of the shaft holder 5 described later rotatably are spaced at a predetermined distance in the circumferential direction in the other side portion 32 (see (e) of FIG. 5). To simplify the work for attaching the holder shaft portion 5*a* to the each of the holder shaft receiving holes 32*a*, holder shaft guide portions 3*b* for guiding the holder shaft portion 5*a* to each of the holder shaft receiving hole 32*a* are provided in the inner circumferential face of the sticking tool main body 3 such that they are projected inwardly. Further, a step portion 3*c* is provided in the inner circumferential face of the sticking tool main body 3 by differentiating the inner diameters and a portion above this step portion 3*c* acts as a large diameter portion 3*d* while a portion below this step portion 3*c* acts as a small diameter portion 3*e* (see (f) of FIG. 5). The shaft portion receiving member 6 described later can be held such that it is fitted to the inside of the sticking tool main body 3 using this step portion 3*c*. Further, a substantially triangular stopper portion 3*f* as seen in its plan view is provided in the central portion in the length direction of the outer peripheral face of the sticking tool main body 3 such that it, projects backward from the both side portions 31, 32. The top of this sticking tool main body 3 is formed open and projecting portions 3*g* which project upward relative to the other portions and can be fitted to fitting holes 85*a* in the handle 8 such that they are capable of playing freely and a pair of engaging holes 3*h* which the engaging protrusions 85*b* of the handle 8 can engage are formed at the top portions of the both side portions 31, 32. Additionally, a shaft insertion hole 33*a* is formed in the bottom face portion 33 so that the shaft portion 4 can be inserted therein.

Figure 6:
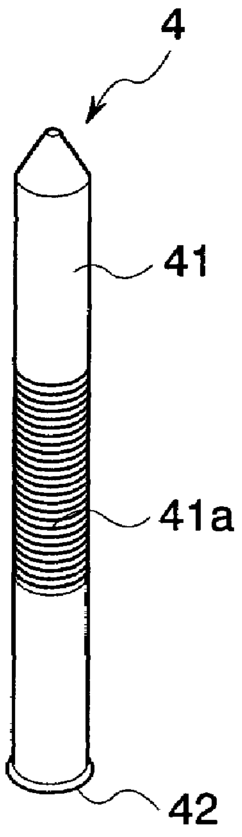
Fig.6 PRIOR ART
FIG. 6 illustrates a shaft portion of the embodiment.
Figure 6:
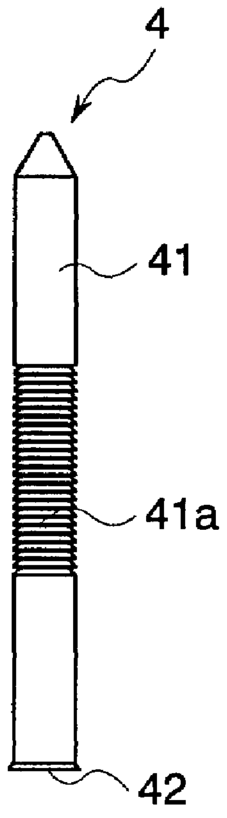
Fig.6 PRIOR ART

As shown in FIG. 6 ((a) of FIG. 6 is a perspective view of the shaft portion 4 and (b) of FIG. 6 is a front view thereof), the shaft portion 4 is formed of for example, synthetic resin material and inserted slidably into the shaft portion insertion hole 33*a* in the sticking tool main body 3, and includes a proximal portion 41 having the outside diameter which allows itself to pass through the hole of the patch P and a tapered expanded portion 42 which is expanded over the inside diameter of the hole of the patch P. A saw-like first threaded portion 41*a* is formed in the outer periphery at the central portion of the base portion 41 in the axial direction.

Figure 7:
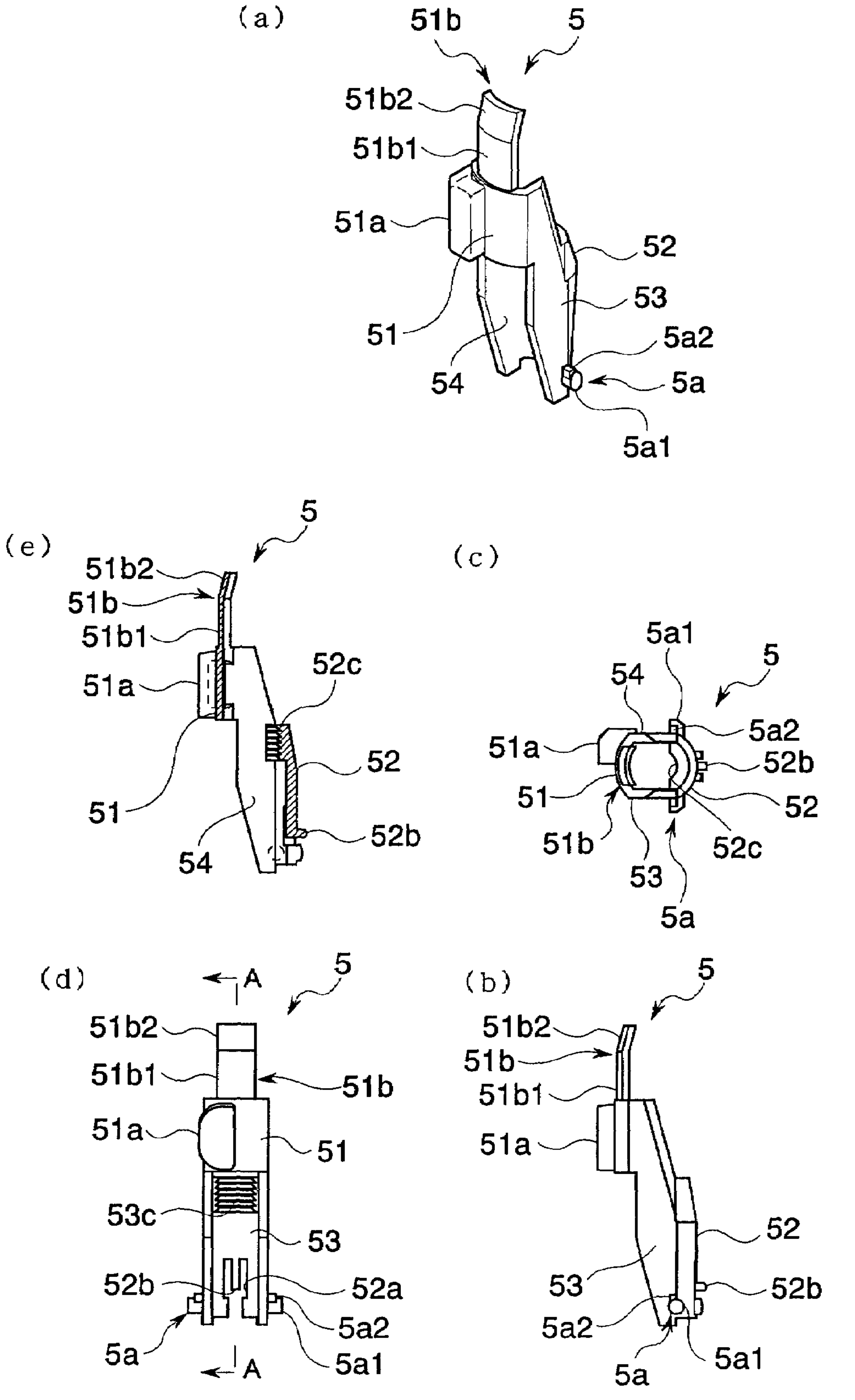
Fig.7 PRIOR ART
FIG. 7 illustrates a shaft holder of the embodiment.

As shown in FIG. 7 ((a) of FIG. 7 is a perspective view of the shaft holder 5, (b) of FIG. 7 is a front view thereof, (c) of FIG. 7 is a side view thereof as seen from the side of the first side portion 51, (d) of FIG. 7 is a plan view thereof, (e) of FIG. 7 is a sectional view taken along the line A-A of (c) of FIG. 7), the shaft holder 5 is an integrally molded product, which is formed of for example, synthetic resin material, and including mainly, a front face portion 53 and a rear face portion 54 formed in a substantially flat shape, one arc-shaped side portion 51 provided to connect the top end portions of the front face portion 53 and the rear face portion 54 and arc-shaped another side portion 52 provided to connect portions from the central portion to the bottom end portion of the front face portion 53 and the rear face portion 54. In a following description, the aforementioned "one side portion 51" is called "first side portion 51" and the "another side portion 52" is called "second side portion 52". A holder shaft portion 5*a* which is supported rotatably by the holder shaft receiving hole 32*a* of the sticking tool main body 3, is provided at each bottom end portion (in other words, distal end portion of the shaft holder 5) of the connecting portion between the second side portion 52 and the front face portion 53 and the connecting portion between the second side portion 52 and the rear face portion 54. Each holder shaft portion 5*a* is constituted by a holder shaft main body 5*a*1 which can be inserted into the holder shaft receiving hole 32*a* and a protrusion 5*a*2 whose projecting dimension is set smaller than the holder shaft main body 5*a*1 and which can makes a pressure contact with or a firm contact with the holder shaft guide portion 3*b* provided on the inner periphery of the sticking tool main body 3 when the holder shaft main body 5*a*1 is inserted into the holder shaft receiving hole 32*a*. A slit 52*a* is formed at the bottom end portion of the second side portion 52 along the axial direction, this slit 52*a* allowing the bottom end portions of the front face portion 53 and the rear face portion 54 to be elastically deformed in the direction in which they approach or leave each other. According to this embodiment, the dimension between the front end portions of the protrusions 5*a*2 of the respective holder shaft portions 5*a* is set slightly larger than the diameter between the holder shaft guide portions 3*b* and when the holder shaft portions 5*a* are guided with the holder shaft guide portions 3*b* in the pressure contact condition or firm contact condition, the bottom end portions of the front face portion 53 and the rear face portion 54 are contracted in the diameter direction (in other words, elastically deformed in the direction in which the bottom end portions approach each other) and when the holder shaft main bodies 5*a*1 are inserted into the holder shaft receiving holes 32*a*, the bottom end portions of the front face portion 53 and the rear face portion 54 are restored elastically in the direction in which they depart from each other due to the elastic restoration force, so that the protrusions 5*a*2 of the holder shaft portions 5*a* come into a pressure contact with or a firm contact with the holder shaft guide portions 3*b*, thereby maintaining excellent mounting condition. A sideway projecting portion 52*b* which projects downward within the slit 52*a* in the second side portion 52 while its distal end projects outwardly is provided so that when the shaft holder 5 is mounted in the sticking tool main body 3, the distal end portion of the sideway projecting portion 52*b* makes into a pressure contact or firm contact with the inner peripheral face of the sticking tool main body 3. A saw-like second meshing portion 52*c* capable of meshing with a first meshing portion 41*a* on the shaft portion 4 is formed in the axial direction in the inner peripheral face at the top end portion of the second side portion 52. On the other hand, a button portion 51*a* which projects outwardly and is capable of being fitted to the button fitting portion 31*a* of the sticking tool main body 3 is provided in a portion near the rear face portion 54 of the first side portion 51. This button portion 51*a* has a substantially D-like shape in its side view and is exposed outside of the sticking tool main body 3 through the button fitting portion 31*a* when the shaft holder 5 is mounted in the sticking tool main body 3. Further, a upward projecting portion 51*b*1 which projects upward from the top end portion of the front face portion 53 and the rear face portion 54 and contact portion main body 51*b*2 which extends upward from the distal end of the upward projecting portion 51*b*1 while tilted inward at a predetermined angle are provided at the top end portion (in other words, proximal end portion of the shaft holder 5) of the first side portion 51. Further, a contact portion 51*b* which can make contact with the shaft portion receiving member 6 described next, when the shaft holder 5 is mounted in the sticking tool main body 3 is provided.

Figure 8:
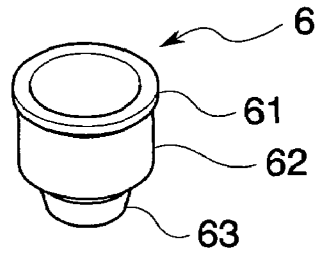
FIG. 8 illustrates a shaft receiving portion of the embodiment.
Figure 8:
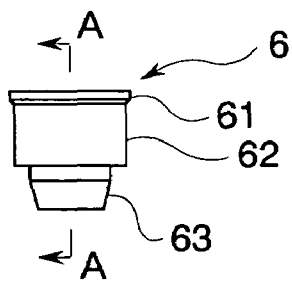
Figure 8:
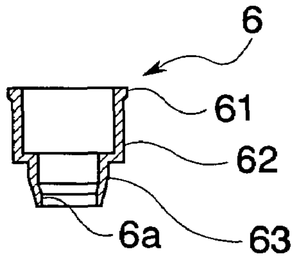

As shown in FIG. 8 ((a) of FIG. 8 is a perspective view of the shaft portion receiving member 6, (b) of FIG. 8 is a front view thereof and (c) of FIG. 8 is a sectional view taken along the line A-A of (b) of FIG. 8), the shaft portion receiving member 6 is molded of for example, synthetic resin in a stepped cylindrical form and includes a bearing portion receiving hole 6*a* which goes through in the axial direction. The diameter of an opening at the bottom end of the shaft portion receiving hole 6*a* is set slightly larger than the outside diameter of the base portion 41 of the shaft portion 4. This shaft portion receiving member 6 is provided with a large diameter engaging portion 61, a medium diameter portion 62 and a taper portion 63 having a tapered face whose diameter decreases gradually as it goes toward its bottom end portion and the outside diameter of the large diameter engaging portion 61 is set smaller than the large diameter portion 3*d* formed on the inner peripheral face of the sticking tool main body 3 and larger than the small diameter portion 3*e* formed on the inner peripheral face and the outside diameter of the medium diameter portion 62 is set slightly smaller than the small diameter portion 3*e* formed on the inner peripheral face of the sticking tool main body 3.

Figure 9:
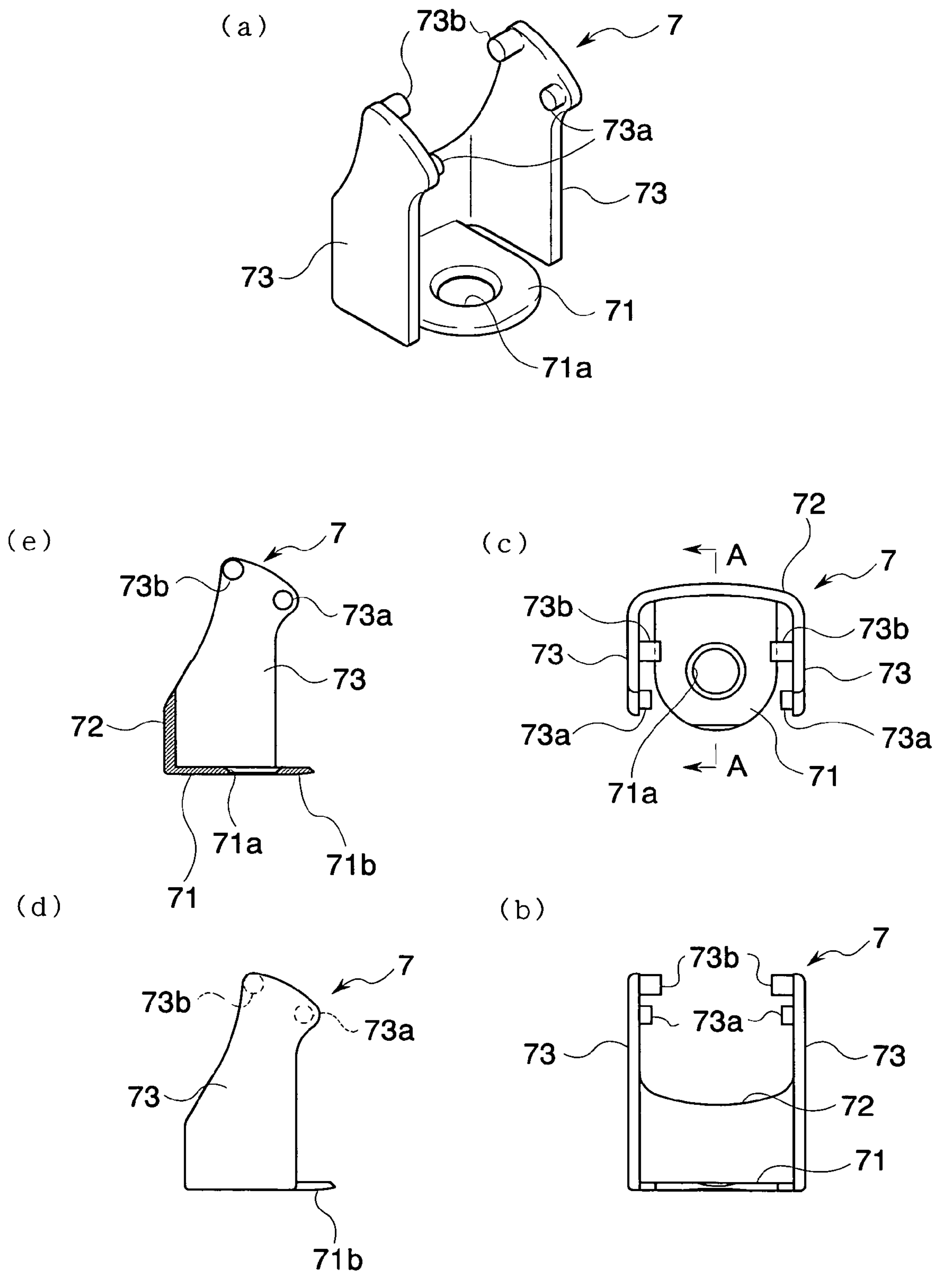
FIG. 9 illustrates an alignment portion of the embodiment.

As shown in FIG. 9 ((a) of FIG. 9 is a perspective view of the alignment portion 7, (b) of FIG. 9 is a front view thereof, (c) of FIG. 9 is a plan view thereof, (d) of FIG. 9 is a side view thereof, and (e) of FIG. 9 is a sectional view taken along the line A-A of (c) of FIG. 9), the alignment portion 7 is formed of, for example, synthetic resin material, and integrally constituted by a substantially thin plate-like alignment portion main body 71 having an alignment hole 71*a* which is a target portion of the present invention having a diameter substantially meeting the diameter of the punch hole Xa, a rear rising portion 72 rising from the rear end portion of the alignment portion main body 71 and a pair of sideway rising portions 73 extending forward and upward from both side edges of the rear rising portion 72. The alignment hole 71*a* is tapered downward so that its diameter decreases gradually and its minimum diameter on the bottom face substantially meets the diameter of the punch hole Xa. The rotary shaft 73*a* which projects inward and is supported rotatably by the rotary shaft receiving portion 2*a* in the casing body 2 is provided at the front end portion of the top end portion of each sideway rising portion 73 and the guide shaft 73*b* which projects inward and can make contact with the guide groove 3*a* in the sticking tool main body 3 in conditions in which it is inserted through the guide hole 2*b* in the casing body 2 is provided at a position deviated to the rear rising portion 72 and upward with respect to the rotary shaft 73*a*. According to this embodiment, the inner projection dimension of the guide shaft 73*b* is set bigger than that of the rotary shaft 73*a*. Further, the extending portion 71*b* which is extended forward with respect to the rotary shaft 73*a* as seen in a side view is formed at the front end portion of the alignment portion main body 71 and by forming the bottom face portion of this extending portion 71*b* into a partially circular shape which curves upward gradually as it goes toward its front end, interference of the extending portion 71*b* with a paper X or the like (particularly peripheral portion Xb of the punch hole Xa) when the alignment portion 7 rotates between its overlapping position (Q) and its retraction position (R), as described later, is avoided. On the other hand, the top face of the extending portion 71*b* is formed in a flat face like the other top faces, so that the entire top face of the alignment portion main body 71 including the top face of the extending portion 71*b* is parallel to the paper X when the alignment portion 7 is positioned at the overlapping position (Q) at the time of sticking of the patch P. A gap capable of accommodating respective side faces of the casing body 2 is formed between both side edges of the alignment portion main body 71 and the respective sideway rising portions 73 when the alignment portion 7 is assembled with the casing body 2.

Figure 10:
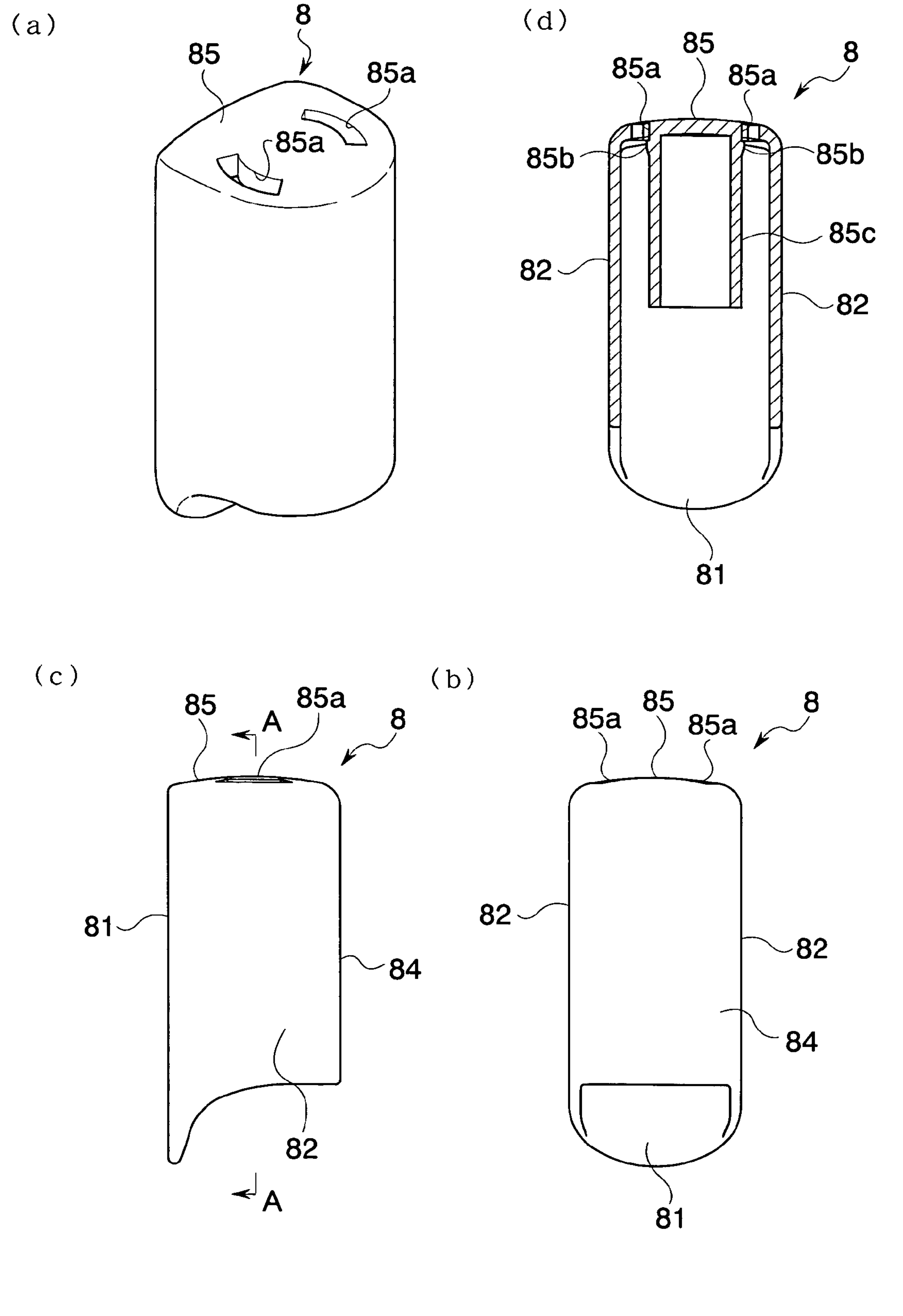
FIG. 10 illustrates a handle of the embodiment.

As shown in FIG. 10 ((a) of FIG. 10 is a perspective view of the handle 8, (b) of FIG. 10 is a front view thereof, (c) of FIG. 10 is a side view thereof and (d) of FIG. 10 is a sectional view taken along the line A-A of (c) of FIG. 10), the handle 8 is formed of, for example, synthetic resin material into a cylinder having a substantially D-like section as seen in its plan view with its rear face portion 81 and both side face portions 82 formed in a substantially flat shape and its front face portion 84 formed with a roundness so that the casing body 2 can be mounted therein. According to this embodiment, the rear face portion 81 is set into substantially partially circular shape as seen in its front view, which projects downward from the bottom end portion of the front face portion 84. This handle 8 is closed at an upper portion with a top face portion 85, and the fitting holes 85*a* which a pair of the projecting portions 3*g* can be fitted to such that they can play freely are formed in this top face portion 85 and the engaging protrusions 85*b* capable of engaging a pair of the engaging holes 3*h* formed in the sticking tool main body 3 are provided below the respective fitting holes 85*a* (see (d) of FIG. 10). Further, an inner cylindrical portion 85*c* extending downward from the bottom face of the central portion of the top face portion 25 is provided, so that when the handle 8 is assembled with the sticking tool main body 3, the front end portion of this inner cylindrical portion 85*c* can make contact with the large diameter engaging portion 61 of the shaft receiving member 6.

Figure 11:
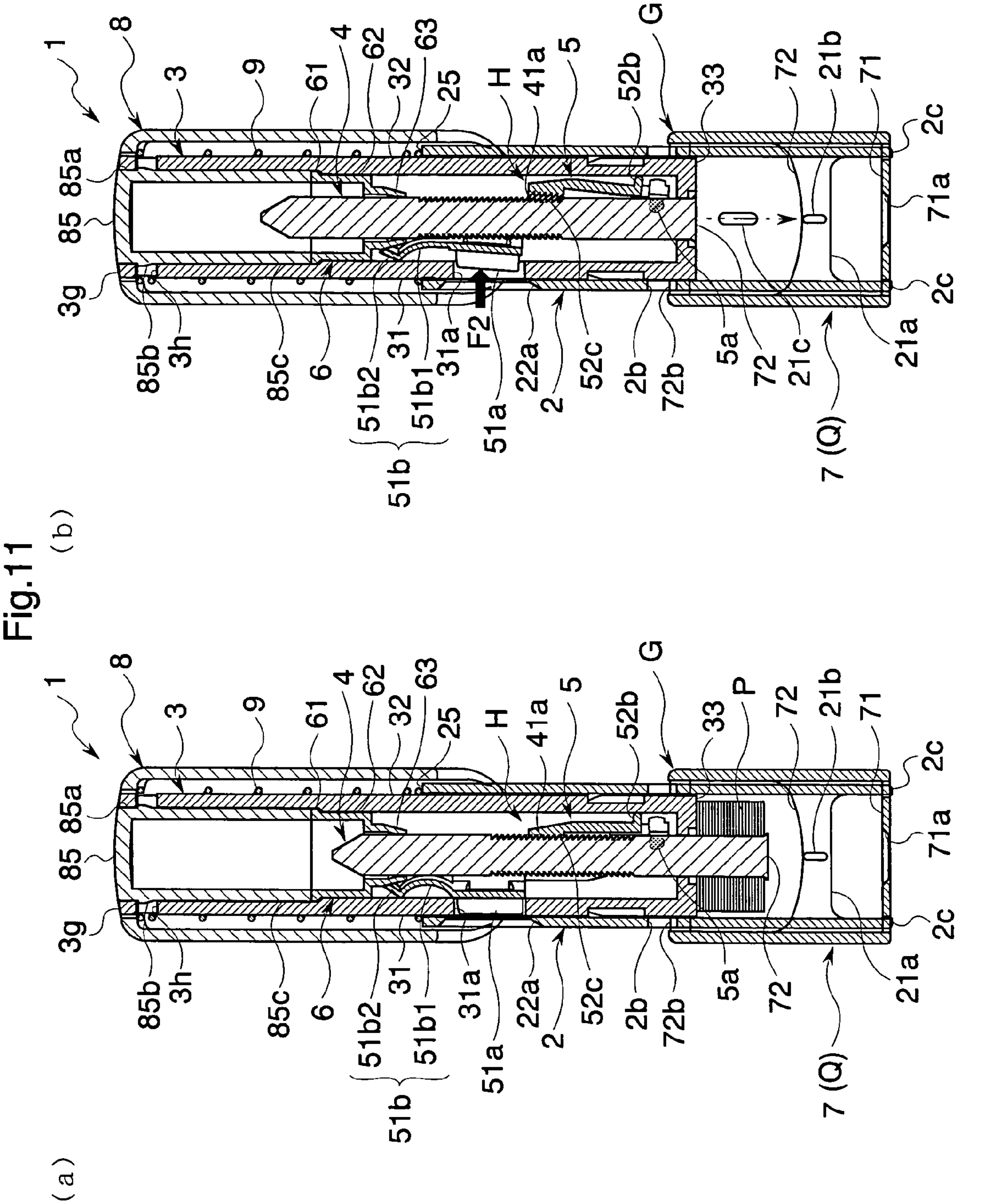
FIG. 11 is an operation explanatory diagram showing schematically a section taken along A-A in FIG. 1.

Next, the procedure of installing the respective portions will be described with reference to FIGS. 1, 2 and 11 (FIG. 11 shows schematically the section taken along the line A-A of FIG. 1, (a) of FIG. 11 shows a condition in which no pressing force F1 is applied to the handle 8 and (b) of FIG. 11 shows a condition in which the pressing force F1 is applied to the handle 8).

First, the shaft holder 5 is inserted from above the sticking tool main body 3 and mounted on the sticking tool main body 3. More specifically, this work is performed by moving the holder shaft portions 5*a* of the shaft holder 5 under a guide of the holder shaft guide portions 3*b* provided on the sticking tool main body 3 and then inserting each holder shaft main body 5*a*1 into each of the holder shaft receiving holes 32*a* formed in the sticking tool main body 3. In this condition, the button portion 51*a* of the shaft holder 5 is fitted to the button fitting portion 31*a* of the sticking tool main body 3 so that it is exposed outside and the sideway projecting portion 52*b* of the shaft holder 5 keeps contact with the inner peripheral face of the sticking tool main body 3 (see (a) of FIG. 11).

Next, the shaft portion receiving member 6 is inserted from above the sticking tool main body 3 so that the large diameter engaging portion 61 of the shaft portion receiving member 6 engages the step portion 3*c* of the sticking tool main body 3. In this condition, the contact portion 51*b* of the shaft holder 5 keeps contact with the tapered portion 63 of the shaft portion receiving member 6. In this way, the sticking tool main body 3 loaded with the shaft holder 5 and the shaft portion receiving member 6 internally is inserted from below the casing body 2, so that the sticking tool main body 3 is exposed from the casing body 2 through the insertion hole 25*a* formed in the top face portion 25 of the casing body 2 up to a position in which the stopper portion 3*f* comes into contact with the top face portion 25. With a coil spring 9 mounted on the sticking tool main body 3 exposed from the casing body 2, the sticking tool main body 3 is inserted from below the handle 8 with the coil spring 9 such that the projecting portions 3*g* provided on the top end portion of the sticking tool main body 3 are fitted to the fitting holes 85*a* formed in the top face portion 25 of the handle 8 and the engaging protrusions 85*b* of the handle 8 is elastically engaged with the engaging holes 3*h* in the sticking tool main body 3 so as to assemble the sticking tool main body 3 equipped with the casing body 2 such that it cannot loose out onto the handle 8. With this condition, the coil spring 9 is provided between the top face portion 25 of the casing body 2 and the top face portion 85 of the handle 8 and on the other hand, the front end portion of the inner cylindrical portion 85*c* of the handle 8 makes contact with the large diameter portion 3*d* of the shaft portion receiving member 6 and accompanied by this event, the contact portion 51*b* of the shaft holder 5 is elastically deformed while accumulating a repulsive force of the upward projecting portion 51*b*1 and at the same time, the contact portion main body 51*b*2 is kept into a contact with the tapered portion 63 of the shaft portion receiving member 6 under a pressure. As a result, a spring action is generated by the elastic repulsive force of the contact portion 51*b* in the entire shaft holder 5 whose proximal end portion is fixed with the holder shaft portion 5*a*, so that the shaft holder 5 is urged in the direction in which it tilts to the side of the side portion 31 of the sticking tool main body 3 with the holder shaft portion 5*a* as a fulcrum point. Further, the button portion 51*a* of the shaft holder 5 is fitted to the button fitting portion 31*a* in the sticking tool main body 3 so that it is exposed through the window portion 22*a* of the casing body 2. In the meantime, the button portion 51*a* is so set to substantially coincide with the outer peripheral face of the sticking tool main body 3 or be located slightly inside of the outer peripheral face for the button portion 51*a* not to interfere with the casing body 2 when the sticking tool main body 3 slides against the casing body 2 (see (a) of FIG. 11).

Next, the alignment portion 7 is installed on the casing body 2 by fitting the rotary shaft 73*a* of the alignment portion 7 into the rotary shaft receiving portion 2*a* of the casing body 2. At this time, the guide shafts 73*b* of the alignment portion 7 are inserted into the guide holes 2*b* in the casing body 2 and subsequently, fitted to the guide grooves 3*a* in the sticking tool main body 3. Then, this alignment portion 7 can rotate between the overlapping position (Q), which substantially overlaps the peripheral edge Xb of the punch hole Xa, more specifically, the overlapping position (Q) in which the alignment portion main body 71 overlaps the peripheral edge Xb of the punch hole Xa in the paper X or the like with the alignment hole 71*a* formed in the alignment portion main body 71 communicating with the punch hole Xa, and the retraction position (R) never interfering with the sticking tool main body 3 and the paper X which can be obtained when the guide shaft 73*b* is guided into the guide groove 3*a* with the rotary shaft 73*a* as a fulcrum point as the sticking tool main body 3 moves in a projection direction (downward) with respect to the casing body 2 if the operation force pressing the handle 8 (hereinafter referred to simply as "pressing force F1") is applied. That is, when the alignment portion 7 is at the overlapping position (Q), the alignment hole 71*a* can be located coaxially with the punch hole Xa and when the alignment portion 7 is at the retraction position (R), the alignment hole 71*a* cannot be located coaxially with the punch hole Xa. The sticking tool 1 of this embodiment includes an actuating mechanism for actuating the alignment portion 7 so as to be movable between the overlapping position (Q) and the retraction position (R) and more specifically, this actuating mechanism includes a rotating portion T for rotating the alignment portion 7 and constituted by the rotary shaft 73*a* and the rotary shaft receiving portion 2*a* with respect to the casing body 2 between the overlapping position (Q) and the retraction position (R) and a guide portion G constituted by the guide shaft 73*b*, the guide grooves 3*a*, and the guide holes 2*b*, and guiding the rotary motion the overlapping position (Q) and the retraction position (R) between of the alignment portion 7. Then, the rotary shafts 73*a* of the rotating portion T is set at a position deviated to an opposite side to the rotation direction of the alignment portion 7 from the overlapping position (Q) to the retraction position (R) with respect to the axis m of the casing body 2. In the meantime, when the alignment portion 7 is at the overlapping position (Q), the bottom face portion of the alignment portion main body 71 is located slightly above the bottom end portion 2*c* of the casing body 2.

Finally, with the alignment portion 7 located compulsorily at the retraction position (R), the shaft portion 4 holding the stacked patches P is inserted into the shaft portion insertion hole 33*a* formed in the bottom face portion 33 of the sticking tool main body 3 with its front end portion first and the first meshing portion 41*a* of the shaft portion 4 is meshed with the second meshing portion 52*c* in the shaft holder 5 and held by the shaft holder 5. The shape of teeth of the first meshing portion 41*a* and the second meshing portion 52*c* is of shape which permits the shaft portion 4 to move only in the direction of being submerged into the sticking tool main body 3 through the shaft portion insertion hole 33*a* and the first meshing portion 41*a* and the second meshing portion 52*c* constitute the holding portion H of the present invention.

Further, because as described previously, the shaft holder 5 is urged in the direction in which it tilts to the side of the side portion 31 of the sticking tool main body 3 with the holder shaft portion 5*a* as a fulcrum point by the spring action, the second meshing portion 52*c* provided on the inner peripheral face portion of the second side portion 52 of the shaft holder 5 engages with the first meshing portion 41*a* of the shaft portion 4 securely. The motion of the shaft portion 4 in the direction of being submerged into the sticking tool main body 3 (upward) is set up to be carried out smoothly because the shaft portion 4 after passing the shaft holder 5 is accommodated in the shaft portion receiving hole 6*a* of the shaft portion receiving member 6.

Figure 12:
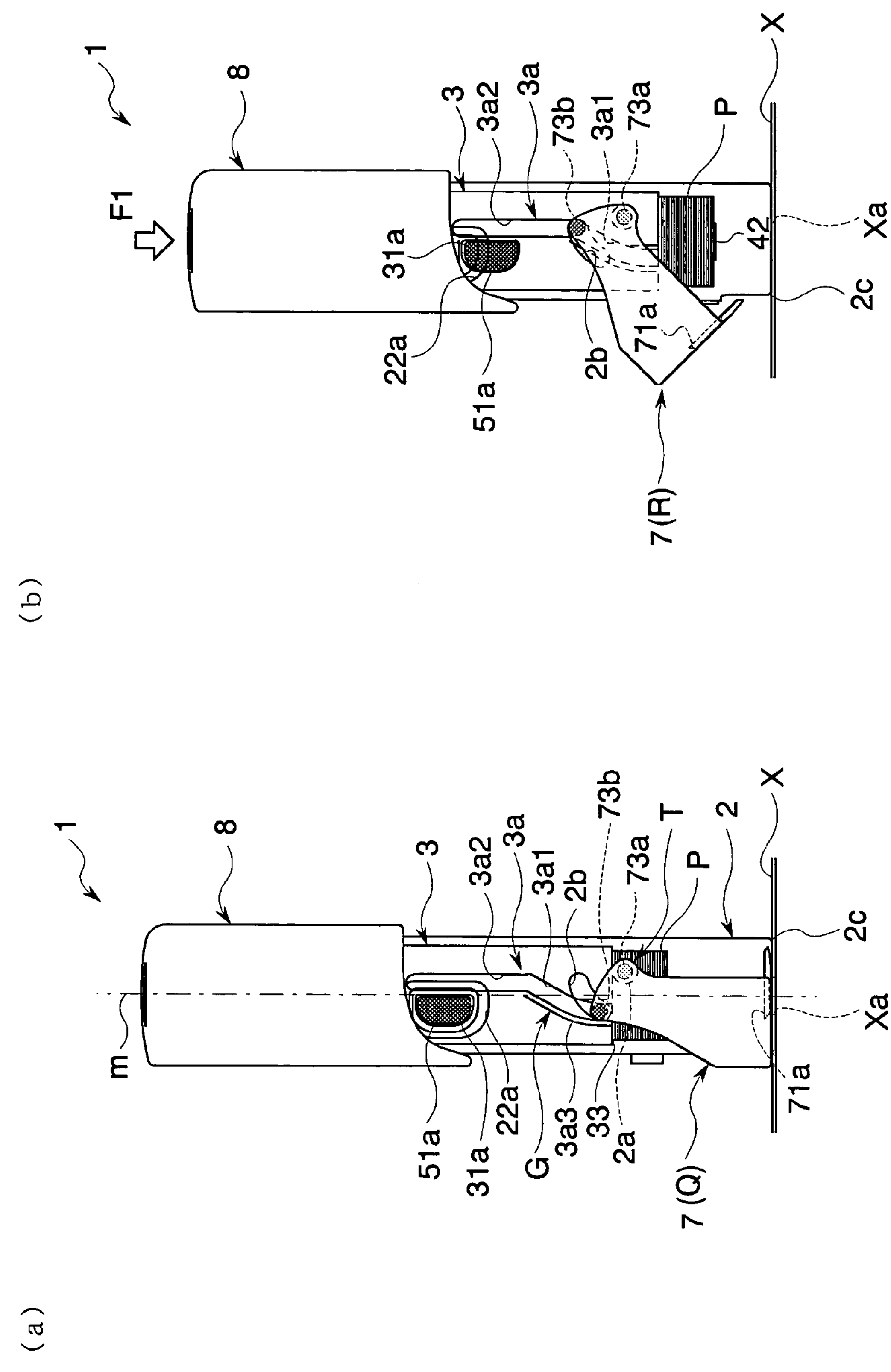
FIG. 12 is an operation explanatory diagram of the sticking tool of the embodiment.
Figure 13:
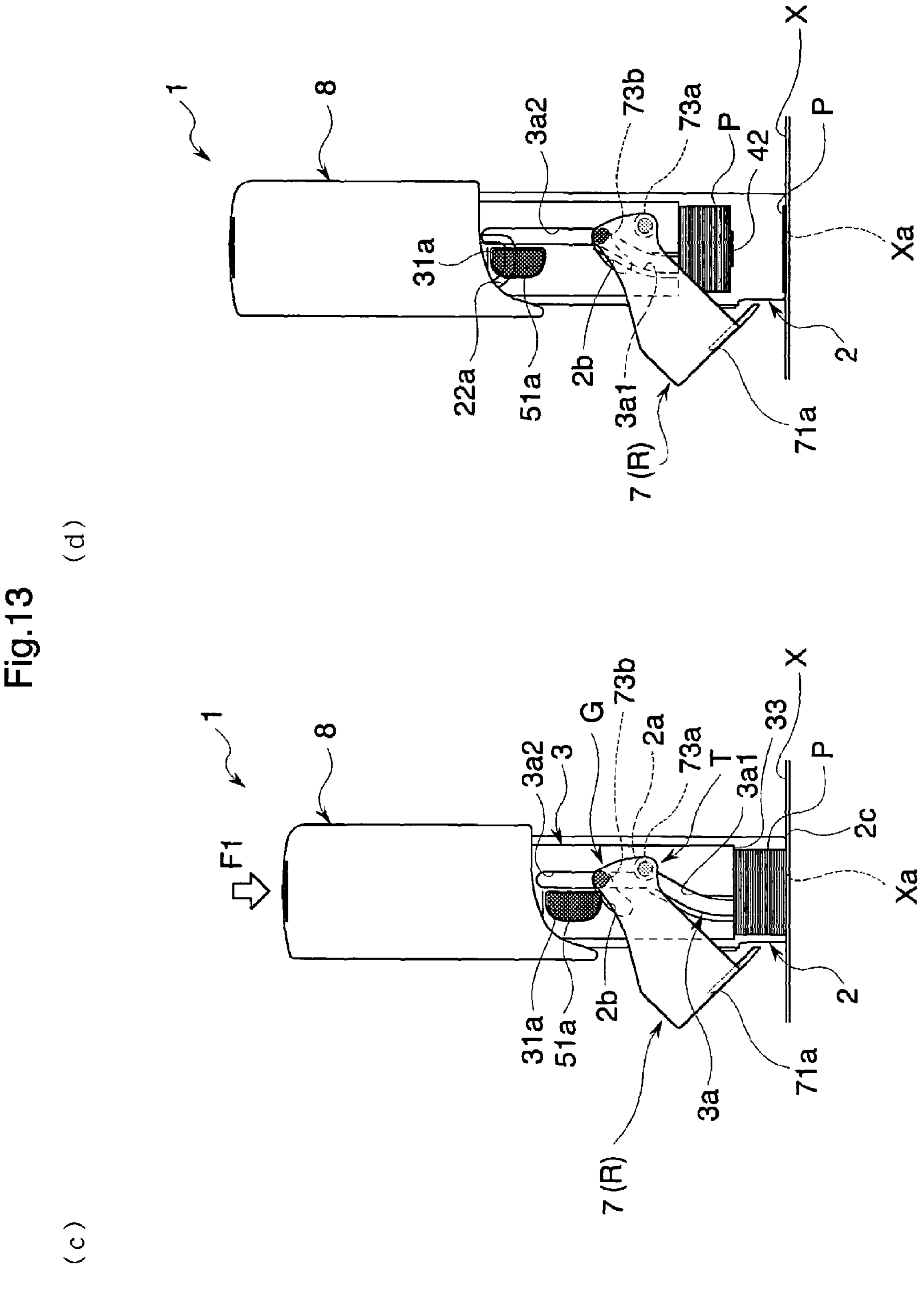
FIG. 13 is an operation explanatory diagram of the sticking tool of the embodiment.

Next, the use method and operation of the sticking tool 1 assembled in the above-described procedure will be described with reference to FIGS. 11-13 (FIGS. 12, 13 are an operation explanatory diagrams showing schematically the side of the sticking tool 1 as seen from one side portion 31 of the sticking tool main body 3. In the meantime, in FIGS. 12, 13, the button portion 51*a*, the rotary shaft 73*a* and the guide shaft 73*b* are indicated with each different pattern for convenience of description).

First, an alignment position for sticking the patch P to the peripheral edge Xb of the punch hole Xa is obtained by bringing the bottom end portion 2*c* of the casing body 2 into contact with the paper X such that the alignment hole 71*a* formed in the alignment portion main body 71 of the alignment portion 7 located at the overlapping position (Q) coincides with the punch hole Xa in the paper X and relative positions of the shaft portion 4 and the sticking tool main body 3 to the punch hole Xa are determined (see (a) of FIG. 12). In this case, because the casing body 2 is transparent, alignment between the alignment hole 71*a* and the punch hole Xa is facilitated.

When the sticking tool main body 3 is moved downward at a predetermined distance within the casing body 2 by applying the pressing force F1 to the handle 8, the alignment portion 7 rotates from the overlapping position (Q) to the retraction position (R) by the rotating portion T and the guide portion G of the actuating mechanism. More specifically, with motion downward of the sticking tool main body 3, the alignment portion 7 guides the guide shaft 73*b* along the circular portion 3*a*1 of the guide groove 3*a* with the rotary shaft 73*a* as a fulcrum point so that the alignment portion 7 automatically moves from the overlapping position (Q) to the retraction position (R) (see (b) of FIG. 12).

When the pressing force F1 is continued to be applied, the sticking tool main body 3 moves downward with respect to the casing body 2 until the expanded portion 42 of the shaft portion 4 makes contact with the peripheral portion Xb of the punch hole Xa and if the pressing force F1 is continued to be applied further in this condition, the pressing force F1 is applied to the patch P from the bottom face portion 33 of the sticking tool main body 3 along the shaft portion 4 so that the patch P located at the bottommost of the stacked patches P is pushed out to the expanded portion 42 of the shaft portion 4. At this time, the inside diameter of the patch P located at the bottommost is pushed wide and separation is generated by relative displacement in the facial direction caused between the patch P located at the bottommost and a patch P in the neighborhood thereof, so that the patch P at the bottommost is stuck to the peripheral portion Xb of the punch hole Xa (see (c) of FIG. 13). At this time, the alignment portion 7 maintains its retraction position (R) by guiding the guide shaft 73*b* along the linear portion 3*a*2 of the guide groove 3*a* so as to permit the sticking tool main body 3 to move downward with respect to the casing body 2. In the meantime, the guide shaft 73*b* is set to be located at the bottommost end of the guide hole 2*b* formed in the casing body 2 when the alignment portion 7 is at the overlapping position (Q) and be located at the topmost end of the guide hole 2*b* when the alignment portion 7 is at the retraction position (R). Further, because the expanded portion 42 is tapered, the patch P located at the bottommost can be pushed out along taper of the expanded portion 42 thereby avoiding faults such as breaking of the hole in the patch P.

When the pressing force F1 is stopped after the patch P located at the bottommost is stuck to the peripheral portion Xb of the punch hole Xa, the sticking tool main body 3 moves upward with respect to the casing body 2 together with the handle 8 by elastic restoration force of the coil spring 9 which is elastically deformed while producing a repulsive force between the handle 8 and the casing body 2 and accompanied by this, the alignment portion 7 maintains its retraction position (R) by guiding the guide shaft 73*b* along the linear portion 3*a*2 of the guide groove 3*a* (see (d) of FIG. 13). Further, when the sticking tool 1 is pulled up so as to take the bottom end portion 2*c* of the casing body 2 off the paper X with the pressing force F1 stopped, the guide shaft 73*b* is guided to the circular portion 3*a*1 of the guide groove 3*a* with the rotary shaft 73*a* as a fulcrum point so that the alignment portion 7 automatically moves from the retraction position (R) to the overlapping position (Q) (not shown).

The patch P can be stuck to the peripheral portion Xa of the punch hole Xa in the above-described manner. In the meantime, it is permissible to move the alignment portion 7 from the retraction position (R) to the overlapping position (Q) at once by picking up the sticking tool 1 at the same time when the pressing force F1 is stopped (taking the bottom end portion 2*c* of the casing body 2 off the paper X) or if the thickness of a single patch P is smaller than a difference in dimension between the bottom end portion 2*c* of the casing body 2 and the bottom face of the alignment portion 71 located at the overlapping position (Q), it is permissible to move the alignment portion 7 from the retraction position (R) to the overlapping position (Q) by stopping the pressing force F1 with the bottom end portion 2*c* of the casing body 2 kept in contact with the paper X.

The shaft portion 4 holding the stacked patches P is moved in the direction of being submerged into the sticking tool main body 3 up to a position in which the patches P are sandwiched between the expanded portion 42 of the shaft portion 4 and the bottom face portion 33 by changing the meshing position between the first meshing portion 41*a* provided in the base portion 41 and the second meshing portion 52*c* in the shaft holder 5 with a decrease of the quantity of the stacked patches P as the sticking work progresses and after the expanded portion 42 comes into contact with the peripheral portion Xb of the punch hole Xa, immediately the pressing force F1 is applied from the bottom face portion 33 of the sticking tool main body 3 to the patch P. Because when the patch P is stuck, the shaft portion 4 is held by the shaft holder 5 urged in the direction of tilting the shaft holder 5 to the side portion 31 of the sticking tool main body 3, the force of tilting the shaft portion 4 toward the side portion 31 of the sticking tool main body 3 is applied. However, because the distal end portion of the shaft portion 4 passing through the shaft holder 5 is accommodated in the shaft receiving hole 6*a* of the shaft portion receiving portion 6 provided within the sticking tool main body 3 so that it coincides with the axis of the sticking tool main body 3, the direction of submersion of the shaft portion 4 is corrected so that an appropriate meshing condition between the first meshing portion 41*a* and the second meshing portion 52*c* is maintained. Consequently, the shaft portion 4 is prevented from loosing out of the sticking tool main body 3 with preference to a separation action between the patch P at the bottommost and the patch P held on the shaft portion 4 in the neighborhood of that patch P when the patch P is stuck.

On the other hand, if a pressing force F2 is applied to the button portion 51*a* exposed from the window portion 22*a* of the casing body 2 as shown in (b) of FIG. 11, the button portion 51*a* is moved inward of the sticking tool main body 3 by this pressing force F2 so that the shaft holder 5 is rotated in the direction of being tilted to the other side portion 32 of the sticking tool main body 3 with the holder shaft portion 5*a* as a fulcrum point. Consequently, the relative position of the shaft holder 5 to the shaft portion 4 changes so as to release the meshing condition between the first meshing portion 41*a* and the second meshing portion 52*c*, so that the shaft portion 4 can be pulled out of the sticking tool main body 3. Thus, if the stacked patches P are consumed completely, new stacked patches P can be set onto the shaft portion 4 pulled out of the sticking tool main body 3 by pressing the button portion 51*a*. The sticking tool 1 of this embodiment is provided with a meshing condition releasing portion which permits the shaft portion 4 to be pulled out of the sticking tool main body 3 by releasing the meshing condition between the first meshing portion 41*a* and the second meshing portion 52*c* attained by the holding portion H using the button portion 51*a*. When the pressing force F2 to the button portion 51*a* is stopped, the shaft holder 5 is rotated in the direction of tilting to the other side portion 31 of the sticking tool main body 3 with the holder shaft portion 5*a* as a fulcrum point due to the elastic restoration force of the contact portion 51*b*, so that the first meshing portion 41*a* and the second meshing portion 52*c* are located at a position which allows them to mesh each other. Thus, by inserting the shaft portion 4 loaded with the new stacked patches P into the sticking tool main body 3, the first meshing portion 41*a* and the second meshing portion 52*c* meshes each other so that the shaft portion 4 is held by the shaft holder 5.

As described above, the sticking tool 1 of this embodiment includes the alignment portion 7 which gives an alignment position for sticking the patch P to the peripheral portion Xb of the punch hole Xa and determining the relative positions of the sticking tool main body 3 and the shaft portion 4 to the punch hole Xa and the actuating mechanism which actuates the alignment portion 7 so that it is movable between the overlapping position (Q) which substantially overlaps the punch hole Xa or the peripheral portion Xb of the punch hole Xa and the retraction position (R) not interfering with the sticking tool main body 3 and the paper X which can be obtained when the pressing force F1 for sticking is applied. Consequently, the punch hole Xa or the peripheral portion Xb of the punch hole Xa can be grasped accurately using the alignment portion 7 located at the overlapping position (Q) so that the relative positions of the sticking tool main body 3 and the shaft portion 4 to the punch hole Xa or the peripheral portion Xb of the punch hole Xa can be determined accurately. Further, because this alignment portion 7 is moved to the retraction position (R) not interfering with the sticking tool main body 3 and the paper X when the pressing force F1 is applied at the time of sticking, a work for moving the alignment portion 7 to the paper X independently of an operation for applying the pressing force F1 becomes unnecessary thereby the sticking work being carried out smoothly and easily.

Further, because the rotary shaft 73*a* of the rotating portion T which constitutes the actuating mechanism is set at a position deviated to the opposite direction to the rotation direction of the alignment portion 7 from the overlapping position (Q) to the retraction position (R) with respect to the axis m of the casing body 2, the alignment portion main body 71 can secure a position substantially parallel to the paper X when it is located at the overlapping position (Q) and further, this alignment portion main body 71 can be brought as close to the paper X as possible. Consequently, positioning between the alignment hole 71*a* and the punch hole Xa can be carried out easily and accurately because the alignment hole 71*a* is formed in the alignment portion main body 71.

Particularly, because the rotating portion T is constituted of the rotary shafts 73*a* provided on the alignment portion 7 and the rotary shaft receiving portions 2*a* which support the rotary shafts 73*a* provided on the casing body 2 rotatably, the structure of the rotating portion T can be simplified.

Further, the actuating mechanism includes a guide portion G constituted by the guide shafts 73*b* provided on the alignment portion 7, guide grooves 3*a* provided in the sticking tool main body 3 and guiding the guide shafts 73*b* along a predetermined trajectory so that the alignment portion 7 takes the overlapping position (Q) or the retraction position (R) accompanying a relative moving of the sticking tool main body 3 in the direction of being submerged into the casing body 2, and guide holes 2*b* provided in the casing body 2 and allowing a relative moving of the guide shafts 73*b* with respect to the guide grooves 3*a* with the guide shafts 73*b* inserted through those guide holes. Consequently, a rotation of the alignment portion 7 between the overlapping position (Q) and the retraction position (R) can be carried out smoothly. When the sticking tool main body 3 is moved relative to the casing body 2 by the pressing force F1 applied at the time of sticking, the guide portion G is guided along the guide groove 3*a* so as to move the alignment portion 7 from the overlapping position (Q) or the retraction position (R), thereby preventing an interference between sticking tool main body 3 and the alignment portion 7 at the time of sticking and securing an excellent operability. Further because the guide shafts 73*b* of the alignment portion 7 are guided by the guide grooves 3*a* in the sticking tool main body 3 in a condition in which they are inserted through the guide holes 2*b* in the casing body 2, the alignment portion 7, the sticking tool main body 3 and the casing body 2 can be related with each other closely.

Because the casing body 2 is formed of transparent material, the relative positions of the sticking tool main body 3 and the shaft portion 4 to the punch hole Xa can be recognized visibly through the casing body 2 although the sticking tool main body 3 and the shaft portion 4 are surrounded by the casing body 2. Because the alignment portion 7 provided with the alignment portion main body 71 having the alignment hole 71*a* communicating with the punch hole Xa at the overlapping position (Q) is formed of substantially thin plate, a work of aligning the alignment hole with the punch hole Xa can be carried out easily and accurately.

Because the holding portion H which allows the shaft portion 4 to move only in the direction of being submerged into the sticking tool main body 3 when the pressing force F1 is applied at the time of sticking and exerts a specified holding force, is provided between the shaft portion 4 and the shaft holder 5, the shaft portion 4 can be moved in the direction of being submerged into the sticking tool main body 3 with a decrease of the quantity of the stacked patches P loaded around the shaft portion 4 so that the stacked patches P can be sandwiched between the bottom face portion 33 of the sticking tool main body 3 and the distal end portion (expanded portion 42) of the shaft portion 4, whereby functioning as an adjuster mechanism. Further because the holding portion H restricts the shaft portion 4 from moving in the direction of projecting from the sticking tool main body 3, separation action between a patch P to be stuck to the peripheral portion Xb of the punch hole Xa and other patch P remaining on the shaft portion 4 can be carried out smoothly.

In this case, the holding portion H is constituted by the saw-like first meshing portion 41*a* provided on the shaft portion 4 and the saw-like second meshing portion 52*c* provided on the shaft holder 5 and capable of engaging with the first meshing portion 41*a*. In addition, the shaft portion 4 is configured to allow the meshing position between the first meshing portion 41*a* and the second meshing portion 52*c* to change only in the direction in which the shaft portion 4 is submerged into the sticking tool main body 3. Therefore, no special mechanism needs to be incorporated inside the sticking tool main body 3 and its structure may be relatively simple.

Particularly, the shaft holder 5 is provided with the holder shaft portions 5*a* provided at the front end portion and supported by the sticking tool main body 3 rotatably and the contact portion 51*b* which is provided at the proximal end portion and makes contact with the shaft portion receiving member 6 when the shaft holder is mounted within the sticking tool main body 3 while it is elastically deformable. The holding portion H generates a spring action in the entire shaft holder 5 by deforming the contact portion 51*b* elastically by pressing it against the shaft portion receiving member 6, so that the first meshing portion 41*a* and the second meshing portion 52*c* urge the shaft holder 5 in the direction in which they mesh each other due to this spring action. Consequently, the meshing condition between the first meshing portion 41*a* and the second meshing portion 52*c* can be kept excellent and further because the shaft holder 5 functions as an urging means, the quantity of necessary components can be reduced as compared with an embodiment in which a special urging member is provided.

On the other hand, because the meshing condition releasing portion for releasing the meshing condition between the first meshing portion 41*a* and the second meshing portion 52*c* attained by the holding portion H so that the shaft portion 4 can be pulled out of the sticking tool main body 3 is provided between the shaft portion 4 and the shaft holder 5, the patches P can be recharged or reset.

When the meshing condition releasing portion is provided on the shaft holder 5 and mounted on the sticking tool main body 3, a specified operation force (pressing force F1) against an urging force of urging the shaft holder 5 in the direction in which the first meshing portion 41*a* and the second meshing portion 52*c* engage each other is applied to the button portion 51*a* exposed outside of the sticking tool main body 3 so that the shaft holder 5 is rotated in the direction of separating the second meshing portion 52*c* from the first meshing portion 41*a* with the holder shaft portion 5*a* as a fulcrum point. Thus, the shaft portion 4 can be pulled out of the sticking tool main body 3 by a simple operation of pressing the button portion 51*a* and consequently, new patches P can be set on the shaft portion 4, thereby securing an excellent practicality.

Further, because the shaft portion receiving member 6 keeping a firm contact with the contact portion 51*b* of the shaft holder 5 within the sticking tool main body 3 receives the shaft portion 4 passing the shaft holder 5 and corrects the submersion direction of the shaft portion 4, the moving of the shaft portion 4 in the direction of being submerged into the sticking tool main body 3 can be carried out smoothly while maintaining an excellent meshing condition between the first meshing portion 41*a* and the second meshing portion 52*c* constituting the holding portion H.

In the meantime, the present invention is not restricted to the above described embodiments.

Although according to the above embodiments, the motion of the alignment portion between the overlapping position and the retraction position is a rotary motion along the perpendicular direction, the present invention is not restricted to this but it may be a rotary motion along the horizontal direction or a sliding motion along the horizontal direction. Then, the actuating mechanism may be so constructed to achieve those respective motions.

Although the alignment portion can function as a cap, any special cap may be attached.

Although according to this embodiment, the holding portion generates a spring action in the entire shaft holder by bringing the contact portion of the shaft holder into a pressure contact with the shaft portion receiving member, it is permissible to bring the shaft holder into a pressure contact with the sticking tool main body so as to generate the spring action in the entire shaft holder.

Although the above embodiments adopt a type in which the patch is stuck to the peripheral portion of the punch hole as a sticking tool, the present invention is not restricted to this example but the sticking tool may be of type in which a stamp main body as a sticking tool main body and an inkpad (soaked with ink or vermilion) or an ink cartridge is accommodated in a casing body and a sticking matter such as ink, vermilion coated on or oozing to the front end portion of the stamp main body is stuck to a specified stamping position (sticking target position) on a sticking target material such as paper. In this case, the requirement of the present invention is to provide with the alignment portion for giving an alignment position for sticking any sticking matter such as ink and vermilion to the stamping position (sticking target position) and the actuating mechanism for actuating the alignment portion so that it is movable between the overlapping position which substantially overlaps the sticking position and the retraction position not interfering with the stamp main body or the sticking target matter which can be obtained when a pressing force for stamping is applied. More specifically, preferably, the alignment portion is provided with a target portion having a shape corresponding to a print pattern of the stamping portion (letter or symbol) engraved in the front end portion of the stamp main body or a shape corresponding to the outer shape of the stamp main body and this target portion is kept to communicate with or overlap a stamping target position when the overlapping position is secured. In the meantime, the target portion may be obtained by attaching a shape corresponding to a print pattern or a shape corresponding to the cross section shape of a stamp main body to the alignment portion by printing, engraving, cutting out or using a seal member.

As the sticking matter, it is permissible to use a seal, tape adhesive or the like instead of the patch, ink or vermilion.

The specific structure of each component is not restricted to the above described embodiments but it may be modified in various ways within a range not departing from the philosophy of the present invention.

What is claimed is:

1. A sticking tool for sticking a sticking matter such as patch or ink to a predetermined sticking target position on a sticking target material such as paper, the tool comprising:

- a casing body whose distal end portion makes contact with the sticking target material at the time of sticking operation;
- a sticking tool main body which is moved in the direction of being projected from and submerged into the casing body by a pressing force applied at the time of the sticking operation so as to stick the sticking matter to the sticking target position, wherein the sticking target position is the peripheral portion of a punch hole formed in the sticking target material, the sticking tool comprises:

a shaft portion holding the stacked patches as a sticking matter in a condition in which the shaft is inserted into holes of the patches and is capable of moving in the direction of being projected from and submerged into the sticking tool main body; and a shaft holder which is provided in the sticking tool main body and capable of holding the shaft portion, and a holding portion is provided between the shaft portion and the shaft holder, thereby allowing the shaft portion to move only in the direction of being submerged into the sticking tool main body when a pressing force is applied at the time of the sticking operation and exerting a specific holding force;

the holding portion includes:

a first meshing portion provided on the shaft portion; and a second meshing portion provided on the shaft holder, and capable of engaging the first meshing portion, and the holding portion is configured to change a meshing position between the first meshing portion and the second meshing portion only in the direction in which the shaft portion is submerged into the sticking tool main body;

the shaft holder includes:

a holder shaft portion provided at a distal end portion and supported by the sticking tool main body; and a contact portion that is elastically deformable and provided at the proximal end portion, the contact portion making contact with either the sticking tool main body or a different member provided in the sticking tool main body when the shaft holder is mounted in the sticking tool main body, and the holding portion generates a spring action in an entire shaft holder by bringing the contact portion into a pressure contact with either the sticking tool main body or the different member provided in the sticking tool main body to elastically deform the contact portion, whereby the shaft holder being urged by this spring action in the direction in which the first meshing portion and the second meshing portion mesh each other;

an alignment portion which gives an alignment position for sticking the sticking matter to the sticking target position; and an actuating mechanism which movably actuates the alignment portion between an overlapping position which substantially overlaps the sticking target position, positioning between the distal end portion of the sticking tool main body and the sticking target material, and a retraction position not interfering with the sticking tool main body and the sticking target material, wherein when the pressing force is applied, the actuating mechanism actuates the alignment portion to move from the overlapping position to the retraction position.

2. The sticking tool according to claim 1, wherein the actuating mechanism includes a rotating portion for rotating the alignment portion with respect to the casing body between the overlapping position and the retraction position, and a rotation shaft of the rotating portion is set at a position deviated to an opposite direction to the rotation direction from the overlapping position of the alignment portion to the retraction position with respect to an axis of the casing body.

3. The sticking tool according to claim 2, wherein the rotating portion is constituted by rotating shafts provided on the alignment portion and rotary shaft receiving portions provided on the casing body and for supporting the rotating shafts.

4. The sticking tool according to claim 2, wherein the actuating mechanism includes a guide portion for guiding a rotary motion of the alignment portion between the overlapping position and the retraction position.

5. The sticking tool according to claim 4, wherein the guide portion includes:

a guide shaft provided on the alignment portion;

guide grooves provided on the sticking tool main body, and guiding the guide shafts along a predetermined trajectory so that the alignment portion takes the overlapping position or the retraction position accompanied by a relative motion of the sticking tool main body in the direction of being projected from and submerged into the casing body; and guide holes through the casing body, which allows the guide shafts to move relative to the guide grooves with the guide shafts inserted therethrough.

6. The sticking tool according to claim 1, wherein the casing body is formed of transparent material, the alignment portion includes an alignment portion main body having a target portion which either communicates with or overlaps the sticking target position at the overlapping position, and the alignment portion main body is substantially in a thin plate shape.

7. The sticking tool according to claim 1, further comprising:

a meshing condition releasing portion which is provided between the shaft portion and the shaft holder, and allows the shaft portion to be pulled out of the sticking tool main body by releasing the meshing condition between the first meshing portion and the second meshing portion attained by the holding portion.

8. The sticking tool according to claim 1, wherein the shaft holder includes:

a button portion capable of being exposed outside of the sticking tool main body when the shaft holder is mounted in the sticking tool main body.

9. The sticking tool according to claim 1, wherein the different member is a shaft receiving member which receives the shaft portion passing through the shaft holder and corrects the submersion direction of the shaft portion.

10. The sticking tool according to claim 2, wherein the casing body is formed of transparent material, the alignment portion includes an alignment portion main body having a target portion which either communicates with or overlaps the sticking target position at the overlapping position, and the alignment portion main body is substantially in a thin plate shape.

11. The sticking tool according to claim 3, wherein the casing body is formed of transparent material, the alignment portion includes an alignment portion main body having a target portion which either communicates with or overlaps the sticking target position at the overlapping position, and the alignment portion main body is substantially in a thin plate shape.

12. The sticking tool according to claim 4, wherein the casing body is formed of transparent material, the alignment portion includes an alignment portion main body having a target portion which either communicates with or overlaps the sticking target position at the overlapping position, and the alignment portion main body is substantially in a thin plate shape.

13. The sticking tool according to claim 1, further comprising:

a meshing condition releasing portion which is provided between the shaft portion and the shaft holder, and allows the shaft portion to be pulled out of the sticking tool main body by releasing the meshing condition between the first meshing portion and the second meshing portion attained by the holding portion.

14. A sticking tool for sticking a sticking matter such as patch or ink to a predetermined sticking target position on a sticking target material such as paper, the tool comprising:

a casing body whose distal end portion makes contact with the sticking target material at the time of sticking operation;

a sticking tool main body which is moved in the direction of being projected from and submerged into the casing body by a pressing force applied at the time of the sticking operation so as to stick the sticking matter to the sticking target position, wherein the sticking target position is the peripheral portion of a punch hole formed in the sticking target material, the sticking tool comprises:

a shaft portion holding the stacked patches as a sticking matter in a condition in which the shaft is inserted into holes of the patches and is capable of moving in the direction of being projected from and submerged into the sticking tool main body; and a shaft holder which is provided in the sticking tool main body and capable of holding the shaft portion, and a holding portion is provided between the shaft portion and the shaft holder, thereby allowing the shaft portion to move only in the direction of being submerged into the sticking tool main body when a pressing force is applied at the time of the sticking operation and exerting a specific holding force;

the holding portion includes:

a first meshing portion provided on the shaft portion; and a second meshing portion provided on the shaft holder, and capable of engaging the first meshing portion, and the holding portion is configured to change a meshing position between the first meshing portion and the second meshing portion only in the direction in which the shaft portion is submerged into the sticking tool main body;

the shaft holder includes:

a holder shaft portion provided at a distal end portion and supported by the sticking tool main body; and a contact portion that is elastically deformable and provided at the proximal end portion, the contact portion making contact with either the sticking tool main body or a different member provided in the sticking tool main body when the shaft holder is mounted in the sticking tool main body, and the holding portion generates a spring action in an entire shaft holder by bringing the contact portion into a pressure contact with either the sticking tool main body or the different member provided in the sticking tool main body to elastically deform the contact portion, whereby the shaft holder being urged by this spring action in the direction in which the first meshing portion and the second meshing portion mesh each other.

* * * * *